US011080780B2

(12) United States Patent
Yankovich

(10) Patent No.: US 11,080,780 B2
(45) Date of Patent: Aug. 3, 2021

(54) METHOD, SYSTEM AND COMPUTER-READABLE MEDIA FOR RENDERING OF THREE-DIMENSIONAL MODEL DATA BASED ON CHARACTERISTICS OF OBJECTS IN A REAL-WORLD ENVIRONMENT

(71) Applicant: eBay Inc., San Jose, CA (US)

(72) Inventor: Steve Yankovich, San Jose, CA (US)

(73) Assignee: eBay Inc., San Jose, CA (US)

(*) Notice: Subject to any disclaimer, the term of this patent is extended or adjusted under 35 U.S.C. 154(b) by 119 days.

(21) Appl. No.: 16/189,674

(22) Filed: Nov. 13, 2018

(65) Prior Publication Data
US 2019/0156393 A1 May 23, 2019

Related U.S. Application Data

(60) Provisional application No. 62/588,189, filed on Nov. 17, 2017.

(51) Int. Cl.
G06Q 30/00 (2012.01)
G06Q 30/06 (2012.01)
(Continued)

(52) U.S. Cl.
CPC ..... *G06Q 30/0643* (2013.01); *G06K 9/00288* (2013.01); *G06K 9/00671* (2013.01);
(Continued)

(58) Field of Classification Search
None
See application file for complete search history.

(56) References Cited

U.S. PATENT DOCUMENTS 5,347,306 A 9/1994 Nitta
6,202,051 B1 3/2001 Woolston
(Continued)

FOREIGN PATENT DOCUMENTS

EP 2259225 A1 12/2010
WO 2001/075731 A1 10/2001
(Continued)

OTHER PUBLICATIONS

He, Lin, Construction of User Preference Profile in a Personalized Image Retrieval, Jun. 1, 2008, 2008 International Conference on Neural Networks and Signal Processing, pp. 434-439 (Year: 2008).*
(Continued)

*Primary Examiner* — Jeffrey A. Smith
*Assistant Examiner* — Timothy J Kang
(74) *Attorney, Agent, or Firm* — FIG. 1 Patents

(57) ABSTRACT

The disclosed technologies identify opportunities to display relevant three-dimensional ("3D") model data within a real-world environment as a user wears a wearable device. The 3D model data can be associated with objects, or items, and the 3D model data rendered for display is relevant in the sense that the items are determined to be of interest to the user and the items fits within the real-world environment in which the user is currently located. For instance, the techniques described herein can recognize items typically found in a kitchen or a dining room of a user's house, an office space at the user's place of work, etc. The characteristics of the recognized items can be identified and subsequently analyzed together to determine preferred characteristics of a user. In this way, the disclosed technologies can retrieve and display an item that correlates to (e.g., matches) the preferred characteristics of the user.

20 Claims, 11 Drawing Sheets

(51) Int. Cl.
  *G06Q 30/02* (2012.01)
  *G06K 9/00* (2006.01)
(52) U.S. Cl.
  CPC ............ *G06Q 30/00* (2013.01); *G06Q 30/02* (2013.01); *G06Q 30/0241* (2013.01); *G06Q 30/0278* (2013.01); *G06Q 30/06* (2013.01); *G06Q 30/0601* (2013.01); *G06Q 30/0603* (2013.01); *G06Q 30/0627* (2013.01); *G06Q 30/0631* (2013.01); *G06T 2215/16* (2013.01)

(56) References Cited

U.S. PATENT DOCUMENTS

| | | | |
|---|---|---|---|
| 6,813,612 | B1 | 11/2004 | Rabenold et al. |
| 8,223,156 | B2 | 7/2012 | Boss et al. |
| 8,285,638 | B2 | 10/2012 | Jung et al. |
| 8,924,880 | B2 | 12/2014 | Altberg et al. |
| 8,965,460 | B1 | 2/2015 | Rao et al. |
| 9,111,285 | B2 | 8/2015 | Amidon et al. |
| 9,286,727 | B2 | 3/2016 | Kim et al. |
| 9,336,541 | B2 | 5/2016 | Pugazhendhi et al. |
| 9,449,342 | B2 | 9/2016 | Sacco |
| 9,588,342 | B2 | 3/2017 | Grigg et al. |
| 9,870,716 | B1 | 1/2018 | Rao et al. |
| 9,921,641 | B1 | 3/2018 | Worley, III et al. |
| 9,996,972 | B1 | 6/2018 | Worley, III et al. |
| 10,008,037 | B1 | 6/2018 | Worley, III et al. |
| 10,163,271 | B1* | 12/2018 | Powers .............. G06Q 30/0631 |
| 10,509,962 | B2 | 12/2019 | Zheng et al. |
| 10,891,685 | B2 | 1/2021 | Yankovich et al. |
| 2002/0128952 | A1 | 9/2002 | Melkomian et al. |
| 2003/0126068 | A1 | 7/2003 | Hauk et al. |
| 2005/0119963 | A1 | 6/2005 | Ko |
| 2008/0091692 | A1 | 4/2008 | Keith et al. |
| 2008/0147566 | A1 | 6/2008 | Malik |
| 2008/0208749 | A1 | 8/2008 | Wallace et al. |
| 2009/0063983 | A1 | 3/2009 | Amidon et al. |
| 2010/0079467 | A1 | 4/2010 | Boss et al. |
| 2010/0125525 | A1 | 5/2010 | Inamdar |
| 2010/0235715 | A1* | 9/2010 | Thatcher ................ G11C 16/10 714/763 |
| 2011/0040645 | A1 | 2/2011 | Rabenold et al. |
| 2011/0072367 | A1 | 3/2011 | Bauer |
| 2011/0270701 | A1 | 11/2011 | Black et al. |
| 2011/0295722 | A1 | 12/2011 | Reisman |
| 2012/0084168 | A1 | 4/2012 | Adair et al. |
| 2012/0084169 | A1 | 4/2012 | Adair et al. |
| 2012/0246036 | A1 | 9/2012 | Marr et al. |
| 2013/0159110 | A1 | 6/2013 | Rajaram et al. |
| 2013/0257877 | A1 | 10/2013 | Davis |
| 2013/0293530 | A1 | 11/2013 | Perez et al. |
| 2013/0293580 | A1 | 11/2013 | Spivack |
| 2014/0040004 | A1* | 2/2014 | Hamo ................ G06Q 30/0201 705/14.35 |
| 2014/0058812 | A1 | 2/2014 | Bender et al. |
| 2014/0100991 | A1 | 4/2014 | Lenahan et al. |
| 2014/0130076 | A1 | 5/2014 | Moore |
| 2014/0143081 | A1 | 5/2014 | Finkelstein et al. |
| 2014/0172570 | A1 | 6/2014 | Arcas et al. |
| 2014/0214547 | A1 | 7/2014 | Signorelli et al. |
| 2014/0267228 | A1 | 9/2014 | Ofek et al. |
| 2014/0267311 | A1 | 9/2014 | Evertt et al. |
| 2014/0279164 | A1 | 9/2014 | Friedman |
| 2014/0279263 | A1* | 9/2014 | Liu ..................... G06Q 30/0627 705/26.63 |
| 2014/0282220 | A1 | 9/2014 | Wantland et al. |
| 2014/0306994 | A1 | 10/2014 | Brown et al. |
| 2015/0070347 | A1 | 3/2015 | Hofmann et al. |
| 2015/0073907 | A1 | 3/2015 | Purves et al. |
| 2015/0294385 | A1* | 10/2015 | Grigg ................ G06Q 30/0613 705/26.41 |
| 2015/0356774 | A1 | 12/2015 | Gal et al. |
| 2015/0379460 | A1 | 12/2015 | Zamer |
| 2016/0012475 | A1 | 1/2016 | Liu |
| 2016/0189426 | A1 | 6/2016 | Thomas et al. |
| 2016/0275723 | A1 | 9/2016 | Singh |
| 2016/0378861 | A1 | 12/2016 | Eledath et al. |
| 2017/0076345 | A1 | 3/2017 | Pan et al. |
| 2017/0091844 | A1* | 3/2017 | Yarvis .................. G06Q 30/016 |
| 2017/0132841 | A1* | 5/2017 | Morrison ........... G06K 9/00671 |
| 2017/0256096 | A1 | 9/2017 | Faaborg et al. |
| 2017/0346776 | A1 | 11/2017 | Valla |
| 2017/0358138 | A1 | 12/2017 | Dack et al. |
| 2018/0096528 | A1 | 4/2018 | Needham |
| 2018/0114329 | A1 | 4/2018 | Wexler et al. |
| 2018/0114372 | A1 | 4/2018 | Nagy et al. |
| 2018/0181997 | A1 | 6/2018 | Sanjeevaiah et al. |
| 2018/0204173 | A1 | 7/2018 | Painter et al. |
| 2018/0336732 | A1 | 11/2018 | Schuster |
| 2019/0080171 | A1 | 3/2019 | Zheng et al. |
| 2019/0156377 | A1 | 5/2019 | Yankovich et al. |
| 2019/0156403 | A1 | 5/2019 | Yankovich et al. |
| 2019/0156410 | A1 | 5/2019 | Yankovich et al. |
| 2019/0156582 | A1 | 5/2019 | Yankovich et al. |
| 2020/0065588 | A1 | 2/2020 | Zheng et al. |
| 2021/0073901 | A1 | 3/2021 | Yankovich et al. |

FOREIGN PATENT DOCUMENTS

| | | |
|---|---|---|
| WO | 2012/044680 A1 | 4/2012 |
| WO | 2013/166360 A2 | 11/2013 |
| WO | 2016/118339 A1 | 7/2016 |
| WO | 2016/210354 A1 | 12/2016 |
| WO | 2018/108536 A1 | 6/2018 |
| WO | 2019/055352 A1 | 3/2019 |
| WO | 2019/099581 A1 | 5/2019 |
| WO | 2019/099585 A1 | 5/2019 |
| WO | 2019/099590 A1 | 5/2019 |
| WO | 2019/099591 A1 | 5/2019 |
| WO | 2019/099593 A1 | 5/2019 |

OTHER PUBLICATIONS

International Search Report received for PCT Application No. PCT/US2018/061139, dated Feb. 14, 2019, 4 pages.
Written Opinion received for PCT Patent Application No. PCT/US2018/061139, dated Feb. 14, 2019, 7 pages.
International Search Report received for PCT Application No. PCT/US2018/061145, dated Feb. 14, 2019, 4 pages.
International Search Report received for PCT Application No. PCT/US2018/061151, dated May 2, 2019, 3 pages.
Written Opinion received for PCT Patent Application No. PCT/US2018/061151, dated May 2, 2019, 7 pages.
International Search Report received for PCT Application No. PCT/US2018/061152, dated Feb. 4, 2019, 3 pages.
Written Opinion received for PCT Patent Application No. PCT/US2018/061152, dated Feb. 4, 2019, 5 pages.
International Search Report received for PCT Application No. PCT/US2018/061154, dated Feb. 14, 2019, 4 pages.
Written Opinion received for PCT Patent Application No. PCT/US2018/061154, dated Feb. 14, 2019, 7 pages.
Xu, et al., Constraint-Based Automatic Placement for Scene Composition, Proceedings of Graphics Interface 2002, Jan. 1, 2002, 10 pages.
Written Opinion received for PCT Patent Application No. PCT/US2018/061145, dated Feb. 14, 2019, 8 pages.
Applicant Initiated Interview Summary Received for U.S. Appl. No. 16/189,720, dated Sep. 4, 2020, 3 pages.
Advisory Action Received for U.S. Appl. No. 16/189,720, dated Jul. 14, 2020, 3 Pages.
Applicant Initiated Interview Summary Received for U.S. Appl. No. 16/189,720, dated Jun. 29, 2020, 3 Pages.
Non-Final Office Action Received for U.S. Appl. No. 16/189,720, dated Aug. 5, 2020, 10 Pages.
Response to Final Office Action filed on Jul. 6, 2020 for U.S. Appl. No. 16/189,720, dated May 19, 2020, 13 pages.
Response to Non-Final Office Action filed on Aug. 31, 2020 for U.S. Appl. No. 16/189,720, dated Aug. 5, 2020, 8 pages.
Applicant Initiated Interview Summary Received for U.S. Appl. No. 16/189,849, dated Jul. 22, 2020, 3 Pages.

(56) References Cited

OTHER PUBLICATIONS

Response to Non-Final Office Action filed on Jul. 28, 2020 for U.S. Appl. No. 16/189,849, dated Apr. 29, 2020, 21 Pages.
Non-Final Office Action Received for U.S. Appl. No. 16/189,720, dated Jan. 30, 2020, 12 pages.
Applicant Initiated Interview Summary Received for U.S. Appl. No. 16/189,720, dated Apr. 17, 2020, 3 pages.
Final Office Action Received for U.S. Appl. No. 16/189,720, dataed May 19, 2020, 16 pages.
Response to Non-Final Office Action filed on Apr. 28, 2020 for U.S. Appl. No. 16/189,720, dated Jan. 30, 2020, 12 pages.
Non Final Office Action Received for U.S. Appl. No. 16/189,849, dated Apr. 29, 2020, 43 pages.
International Preliminary Report on Patentability Received for Application No. PCT/US2018/061139, dated May 28 2020, 9 pages.
International Preliminary Report on Patentability received for PCT Application No. PCT/US2018/061145, dated May 28, 2020, 10 pages.
International Preliminary Report on Patentability received for PCT Application No. PCT/US2018/061151, dated May 28, 2020, 9 pages.
International Preliminary Report on Patentability Received for PCT Application No. PCT/US2018/061152, dated May 28,2020, 7 pages.
International Preliminary Report on Patentability received for PCT Application No. PCT/US2018/061154, dated May 28, 2020, 9 pages.
Notice of Allowance received for U.S. Appl. No. 16/189,720, dated Oct. 9, 2020, 9 Pages.
Non Final Office Action Received for U.S. Appl. No. 16/189,817, dated Nov. 6, 2020, 24 Pages.
Response to Restriction Requirement filed on Sep. 28, 2020 for U.S. Appl. No. 16/189,817, Sep. 22, 2020, 7 pages.
Restriction Requirement Received for U.S. Appl. No. 16/189,817, dated Sep. 22, 2020, 8 pages.
Final Office Action Received for U.S. Appl. No. 16/189,849, dated Sep. 16, 2020, 57 Pages.
Final Office Action received for U.S. Appl. No. 16/189,776, dated Feb. 25, 2021, 27 pages.
Corrected Notice of Allowability received for U.S. Appl. No. 16/189,720, dated Dec. 16, 2020, 2 pages.
Corrected Notice of Allowability Received for U.S. Appl. No. 16/189,720, dated Nov. 9, 2020, 2 pages.
Non Final Office Action Received for U.S. Appl. No. 16/189,776, dated Nov. 10, 2020, 23 pages.
Final Office Action received for U.S. Appl. No. 16/189,817 dated Apr. 20, 2021, 43 Pages.
Google,"Google unveils Project Glass augmented reality eyewear.", Retrieved from URL<<https://www.bbc.com/news/lechnology-17618495>>, Apr. 4, 2012, 7 pages.
Non Final Office Action Received for U.S. Appl. No. 16/189,776, dated Jun. 7, 2021, 30 pages.
Hosoya et al., "A Mirror Metaphor Interaction System: Touching Remote Real Objects in an Augmented Reality Environment", NTT Microsystem Integration Laboratories. 2003. May 20, 2021., <https://ieeexplore.ieee.org/stamp/stamp. sp?tp=&amumber=1240755&tag=1 >(Year: 2003), 2003, 2 Pages.
Hurst et al., "Gesture-based interaction via finger tracking for mobile augmented reality", Multimedia Tools and Applications 62, 233-258. 2013. May 20, 2021. <https://doi.org/10.1007/s 11042-011-0983-y>, (Year: 2013), 2013, 26 pages.

\* cited by examiner

METHOD, SYSTEM AND COMPUTER-READABLE MEDIA FOR RENDERING OF THREE-DIMENSIONAL MODEL DATA BASED ON CHARACTERISTICS OF OBJECTS IN A REAL-WORLD ENVIRONMENT

CROSS-REFERENCE TO RELATED APPLICATIONS

This application claims the benefit of and priority to U.S. Provisional Application No. 62/588,189, filed Nov. 17, 2017 and entitled "Augmented Reality, Mixed Reality, and Virtual Reality Experiences," the entire contents of which are incorporated herein by reference.

BACKGROUND

Conventionally, a user can view an object, or an item, of interest via a web site on a display screen in a two-dimensional ("2D") environment. For instance, the user may be researching information about the item, or even further, the user may be interested in acquiring the item. In these types of scenarios, the user experience is most likely limited to an online experience.

A wearable device has the ability to display virtual content to a user, in an augmented reality ("AR") environment. As use of wearable devices becomes more prevalent, it has become difficult to effectively display virtual content that not only is of interest to the user, but that also "fits" within an immersive real-world environment in which the user is currently located.

Consequently, the user can spend a considerable amount of time viewing three-dimensional ("3D") models of different items in order to find an item that not only is of interest to the user, but that also fits within the immersive real-world environment in which the user is currently located. This may unnecessarily utilize computing resources such as processing cycles, memory, and network bandwidth. Moreover, this might result in inadvertent or incorrect user input to the wearable device rendering the 3D models of different items the immersive real-world environment, which can also unnecessarily utilize computing resources such as processing cycles, memory, and network bandwidth.

It is with respect to these and other technical challenges that the disclosure made herein is presented.

SUMMARY

The techniques described herein identify opportunities to render and display relevant three-dimensional ("3D") model data within an immersive real-world environment as a user wears a wearable device. The 3D model data can be associated with objects, or items, and the 3D model data rendered for display is relevant in the sense that the items are determined to be of interest to the user and the items fits within the immersive real-world environment in which the user is currently located. In order to address the technical problems described briefly above, and potentially others, the disclosed technologies can recognize physical items that exist in the immersive real-world environment in which the user is currently located. For instance, the techniques described herein can recognize common items typically found in a kitchen of a user's house, a dining room of a user's house, an office space at the user's place of work, etc.

The characteristics of a set of items that exist in a real-world environment can be identified and subsequently analyzed together to determine preferred characteristics of a user. The user may be a person wearing a wearable device and/or a person to which the real-world environment belongs (e.g., a child's bedroom, a mother's office, a father's work shop, etc.). In this way, the disclosed technologies can retrieve and render for display an item that correlates to (e.g., matches) the preferred characteristics of the user.

In one example, an analysis of the characteristics may indicate a user preference with regard to a price category such as an "expensive" price category (e.g., the user spends amounts that are substantially more compared to average prices when purchasing items), a "moderate" price category (e.g., the user spends amounts that are within a price range that is close to average prices when purchasing items), an "inexpensive" price category (e.g., the user spends amounts that are substantially less compared to average prices when purchasing items), and so forth.

In another example, an analysis of the characteristics may indicate a user preference with regard to a size category such as a "large" size category (e.g., the sizes of existing items are noticeably larger than average sizes), a "medium" size category (e.g., the sizes of existing items are in line or close to average sizes), a "small" size category (e.g., the sizes of existing items are noticeably smaller than average sizes), and so forth.

In further examples, an analysis of the characteristics may indicate a user preference with regard to a particular brand of items and/or a particular color of items. A "brand" can include a name of a manufacturer or producer, a name of a model, a design, a symbol, or another recognizable or identifiable feature that distinguishes an organization or a product from its rivals for customers thinking about purchasing an item. In even further examples, the characteristics of the existing items may be indicative of a preferred decorative theme or style for the real-world environment (e.g., a sports theme for a child's bedroom, a ballerina theme for a child's bedroom, a cowboy theme for a child's bedroom, etc.).

Once the user preferences for the scanned real-world environment are determined, a virtual item with characteristics that correlate to (e.g., match) the preferred item characteristics for the real-world environment can be retrieved and rendered for display in the real-world environment. Consequently, the virtual item is one that complements physical items that already exist in the environment, and a frictionless approach to viewing and/or purchasing an item that is compatible with, and "fits" within, the real-world environment can be realized.

Aspects of the technologies disclosed herein can be implemented by a wearable device, such as an AR device. For example, a user of such a device might provide input indicating an interest to enter or activate a mode enabling the rendering of 3D model data of recommended items. Accordingly, the wearable device may communicate with a system to recommend and display items to a user based on characteristics of existing items that are already physically present in a particular real-world environment. The wearable device can be configured to scan the real-world environment to recognize the existing items and to analyze the existing items to determine user preferences for item characteristics.

In various embodiments, the scan can be implemented in response to user input that explicitly expresses a user interest in a specific item. For example, a user wearing a wearable device can enter the real-world environment (e.g., a kitchen) and audibly request that the wearable device display a specific item (e.g., a toaster). Based on the user input, the wearable device can scan the real-world environment, collect data on the existing items in the real-world environment, identify characteristics of the existing items without any further input needed from the user, and/or determine preferred characteristics based on an analysis of the identified characteristics.

In additional embodiments, the scan can be implemented in response to user input that amounts to a general request for one or more items. A general request may not identify a specific item, but rather, may suggest an event or reason for item recommendations to be displayed within a real-world environment. For example, a parent can enter a child's room and ask the wearable device to recommend a gift for the child's upcoming birthday. In response to the general request, the wearable device can scan the real-world environment, collect data on the existing items in the real-world environment, identify characteristics of the existing items without any further input needed from the user, and/or determine preferred characteristics based on an analysis of the identified characteristics.

Through implementations of the disclosed technologies, 3D models of items that are of interest to a user and that fit within a particular real-world environment (e.g., a room in a house, an office in an office suite, etc.) can be rendered within different AR environments. The disclosed technologies improve a user experience by identifying relevant opportunities to display content that is of particular interest to the users. In this way, the disclosed technologies tangibly improve computing efficiencies with respect to a wide variety of computing resources that would otherwise be consumed and/or utilized by improving human-computer interaction and by reducing the amount of processing cycles and storage required by previous solutions. Technical benefits other than those specifically identified herein might also be realized through implementations of the disclosed technologies.

It should be appreciated that the above-described subject matter can be implemented as a computer-controlled apparatus, a computer-implemented method, a computing device, or as an article of manufacture such as a computer-readable medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The Detailed Description is described with reference to the accompanying figures. In the figures, the left-most digit(s) of a reference number identifies the figure in which the reference number first appears. The same reference numbers in different figures indicate similar or identical items.

DETAILED DESCRIPTION

This Detailed Description describes identifying opportunities to render and display relevant three-dimensional ("3D") model data within an immersive real-world environment as a user wears a wearable device. The 3D model data can be associated with objects, or items, and the 3D model data rendered for display is relevant in the sense that the items are determined to be of interest to the user and the items fits within the immersive real-world environment in which the user is currently located.

For instance, the techniques described herein can recognize items typically found in a kitchen of a user's house, a dining room of the user's house, an office space at the user's place of work, etc. The characteristics of the recognized items can be identified and subsequently analyzed together to determine preferred characteristics of a user. The user may be a person wearing a wearable device and/or a person to which the real-world environment belongs (e.g., a child's bedroom, a mother's office, a father's work shop, etc.). In this way, the disclosed technologies can retrieve and render for display an item that correlates to (e.g., matches) the preferred characteristics of the user.

Referring now to the FIGS., technologies for efficiently rendering 3D models of items for a user will be described.

Figure 1:
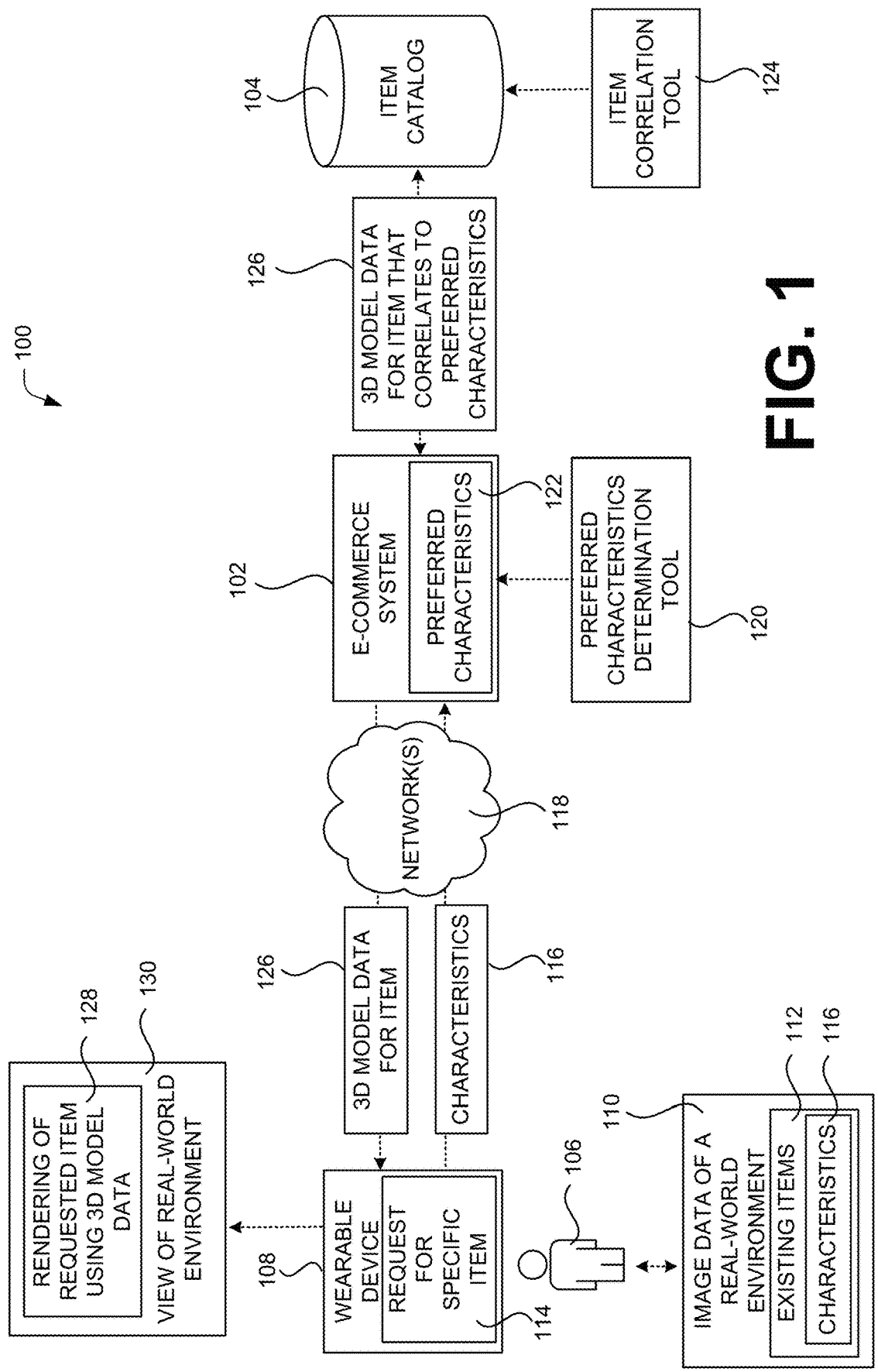
FIG. 1 illustrates aspects of an exemplary computing environment in which a system can cause a 3D model of an item to be rendered, for display, based on characteristics of items that already exist in a real-world environment in which a user is located.

FIG. 1 illustrates aspects of an exemplary computing environment 100 in which a system can cause a 3D model of an item to be rendered, for display, based on characteristics of items that already exist in a real-world environment in which a user is located. As illustrated, the exemplary system may comprise an electronic commerce ("e-commerce") system 102 that includes an item catalog 104 where users and/or merchants can list real-world items for sale. A real-world item can be any type of item including, but not limited to, electronics, home goods, automobiles or automotive parts, clothing, musical instruments, art, jewelry, and so forth. In various examples, the e-commerce system 102 can be implemented on one or more server computers operating in conjunction with of an e-commerce site.

A user 106 can utilize a wearable device 108, such as that described in further detail below with respect to FIG. 9, to obtain image data 110 of the real-world environment in which the user 106 is currently located. For instance, the wearable device 108 can include an optical device configured to scan the real-world environment of the user 106 to obtain the image data 110 (e.g., recognize objects in the real-world environment). In various examples, the image data 110 of the real-world environment includes recognizable existing items 112 that are physically present in the real-world environment.

While the user 106 is in the real-world environment, the user may provide input (e.g., a voice command, a text entry in a search field, a menu option selection, etc.) that amounts to a request to view a virtual representation of a specific item 114. For example, the user 106 can walk into his or her kitchen and ask that the wearable device 108 to display a new toaster. Based on the request, the wearable device 108 can scan the real-world environment, recognize the existing items 112, identify characteristics 116 associated with the existing items 112, and send the characteristics 116 to the e-commerce system 102 over network(s) 118. For example, the characteristics 112 can include a price of an item, a size of an item, a brand of an item, a color of an item, a decorative theme of a group of items, and so forth. A "brand" can include a name of a manufacturer or a producer, a name of a model, a design, a symbol, or another recognizable or identifiable feature that distinguishes an organization or a product from its rivals for customers thinking about purchasing the item.

In some embodiments, the wearable device 108 can send the image data 110 to the e-commerce system 102 and the e-commerce system 102 can recognize the existing items 112 and identify the characteristics 116 associated with the existing items 112. For example, the e-commerce system 102 can look up a price of a specific item via the item catalog.

Upon receiving the image data 110 and/or the characteristics 116, the e-commerce system 102 can employ a preferred characteristics determination tool 120 (e.g., a software component or module) to determine preferred characteristics 122 for the real-world environment. If the real-world environment is a particular room in a home, the preferences can be those of the user 106, or another user that in the home that typically occupies the room. For instance, the user 106 may be a mother or a father using the wearable device 108 to scan the bedroom of a child.

Based on an analysis of the characteristics 116 of the existing items 112, the preferred characteristics determination tool 120 may determine a user preference for a particular brand (e.g., BOSCH, KITCHENAID, etc.) of kitchen items (e.g., appliances) in a kitchen. In another example, based on an analysis of the characteristics 116 of the existing items 112, the preferred characteristics determination tool 120 may determine a user preference to spend amounts within a particular price category for kitchen items in the kitchen. In yet another example, based on an analysis of the characteristics 116 of the existing items 112, the preferred characteristics determination tool 120 may determine a user preference for a particular color or color scheme (e.g., white, stainless steel, etc.) of kitchen items in the kitchen. In even a further example, based on an analysis of the characteristics 116 of the existing items 112, the preferred characteristics determination tool 120 may determine a user preference for a particular size of kitchen items in the kitchen.

In various embodiments, the preferred characteristics 122 may be determined relative to averages. Consequently, in some cases, a preferred characteristic 122 can comprise a category to which the associated characteristics 116 of the existing items are mapped. For example, a preferred price characteristic 122 may include a price category such as an "expensive" price category (e.g., the user spends amounts that are substantially more compared to average prices when purchasing items), a "moderate" price category (e.g., the user spends amounts that are within a price range that is close to average prices when purchasing items), an "inexpensive" price category (e.g., the user spends amounts that are substantially less compared to average prices when purchasing items), and so forth. In another example, a preferred size characteristic 122 may include a size category such as a "large" size category (e.g., the sizes of existing items are noticeably larger than average sizes), a "medium" size category (e.g., the sizes of existing items are in line or close to average sizes), a "small" size category (e.g., the sizes of existing items are noticeably smaller than average sizes), and so forth.

The e-commerce system 102 then uses an item correlation tool 124 to identify an item in the item catalog 104 (e.g., an item available to be purchased) that correlates to (e.g., matches) the preferred characteristics 122, the item being of the type specifically requested by the user 106 (e.g., a toaster for the kitchen). That is, the item correlation tool 124 may identify an item that is of the type requested and that falls within a particular price category and/or a particular size category. Moreover, the item may be associated with a preferred brand, a preferred color, and/or a decorative theme of the kitchen.

Accordingly, the e-commerce system 102 is configured to retrieve 3D model data 126 for the identified item and cause the 3D model data 126 to be rendered for display via the wearable device 108 of the user 106. That is, the e-commerce system 102 transmits the 3D model data 126 to the wearable device 108 so that the wearable device 108 can display a rendering of the item 128, using the 3D model data, in a view of the real-world environment 130 of the user 106. Consequently, in response to the request to view a virtual representation of a specific item 114, the user 106 is provided with a recommended item with characteristics that correlate to (e.g., match) the characteristics 116 of the existing items 112 that are already physically present in the real-world environment. This enables the user 106 to preview how the recommended item fits within the real-world environment before purchasing the item via the item catalog 104.

In some embodiments, item metadata can be displayed with the rendering of the item 128. For instance, the item metadata can include, but is not limited to: a name of the item, a description of the item (e.g., a manufacturer, a model, a size, etc.), a price for the item, and so forth.

An example of a wearable device 108 can include an augmented reality ("AR") device. An AR device is a computing device capable of providing a view of the real-world environment 130 within which physical objects are augmented or supplemented by computer-generated ("CG") sensory input (e.g., sound, video, graphics, etc.). For instance, an AR device might provide a view of the real-world environment 130 with a rendering of an item 128 as an overlay such that the item appears to be present in the view of real-world environment 130. Additional details regarding the configuration and operation of a wearable device 108 capable of providing this functionality is provided below with regard to FIG. 9. In this regard, it is to be appreciated that the rendering of an item 128 by the wearable device 108 using the 3D model data includes displaying a virtual representation of the item in an AR environment, as well as other types of environments, such as mixed reality ("MR") environments or virtual reality ("VR") environments. It is also to be appreciated that the configurations disclosed herein are not limited to use with an AR device. Rather, the technologies disclosed herein can be utilized with any type of computing device that can provide a view of a real-world environment 130 that includes a rendering of an item 128.

It is to be further appreciated that the technologies described herein can be implemented on a variety of different types of wearable devices 108 configured with a variety of different operating systems, hardware components, and/or installed applications. In various configurations, for example, the wearable device 108 can be implemented by the following example wearable devices: GOOGLE GLASS, MAGIC LEAP ONE, MICROSOFT HOLOLENS, META 2, SONY SMART EYEGLASS, HTC VIVE, OCULUS GO, PLAYSTATION VR, or WINDOWS mixed reality headsets. Thus, embodiments of the present disclosure can be implemented in any AR-capable device, which is different than goggles or glasses that obstruct a user's view of real-world objects, e.g., actual reality. The techniques described herein can be device and/or operating system agnostic.

Figure 2:
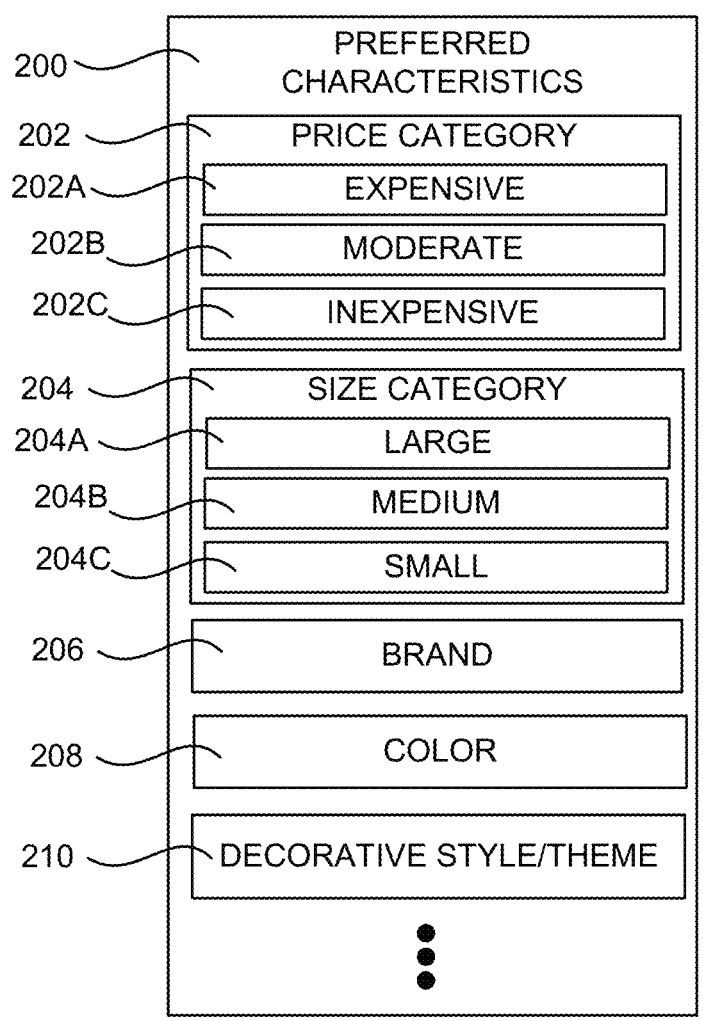
FIG. 2 illustrates examples of preferred characteristics, which are used to identify an item to be displayed via a wearable device of a user.

FIG. 2 illustrates example preferred characteristics 200, which can be used to identify a virtual item to be displayed via a wearable device of a user. As described above, the preferred characteristics determination tool 120 can analyze the characteristics 116 of existing items 112 in a real-world environment to determine, as a preferred characteristics 200, a price category 202. For example, a preference can be mapped to one of the following price categories: an "expensive" price category 202A, a "moderate" price category 202B, or an "inexpensive" price category 202C. The e-commerce system 102 can establish the categories based on an average price of an item in the item catalog 104 and/or by referencing external sources (e.g., third-party retail or e-commerce sites).

Moreover, the e-commerce system 102 can establish the categories using thresholds. For instance, the expensive price category 202A may be representative of a user typically spending more than a threshold percentage above the average prices (e.g., a user likes luxury items and therefore the user typically spends more than 15% over the average price to purchase an item), the moderate price category 202B may be representative of the user typically spending within a threshold percentage of the average prices (e.g., a user likes standard items and therefore the user typically spends amounts within 15% of the average price to purchase an item), and the inexpensive price category 202C may be representative of the user typically spending more than a threshold percentage below the average prices (e.g., a user likes discount items and therefore the user typically spends more than 15% less than the average price to purchase an item). In some instances, the threshold percentages can be based on a type of environment (e.g., dining rooms, a child's room, etc.) and/or a category of items.

Further, the preferred characteristics determination tool 120 can analyze the characteristics 116 of existing items 112 in a real-world environment to determine, as a preferred characteristics 200, a size category 204. The e-commerce system 102 can establish the categories based on an average size for a type of item (e.g., toaster, flat-screen television, etc.) in the item catalog 104 and/or by referencing external sources. For example, a preference can be mapped to one of the following size categories: a "large" size category 204A representative of a user preferring items that are a threshold percentage above the average sizes (e.g., the size of existing items are typically at least 10% larger than average sizes), a "medium" size category 204B representative of the user preferring items that are within the threshold percentage of the average sizes (e.g., the size of existing items are typically within 10% of the average sizes), or a "small" size category 204C representative of the user preferring items that are a threshold percentage below the average sizes (e.g., the size of existing items are typically at least 10% smaller than average sizes).

Even further, the preferred characteristics determination tool 120 can analyze the characteristics 116 of existing items 112 in a real-world environment to determine, as a preferred characteristics 200, a particular brand 206 (e.g., particular features such as logos, icons, shapes, etc. can be recognized and associated with a brand name and/or model), a particular color 208, and/or a particular decorative theme or style 210 (e.g., many of the existing items relate to sports, many of the existing items are rustic, many of the existing item relate to air planes, etc.).

It is understood in the context if this disclosure that other item characteristics can be used in order to determine user preferences and to find an item recommendation that matches the user preferences. Moreover, the names and number of categories described above are provided as examples. In the context of this disclosure, it is understood that a characteristic can include more or less than three categories and that an individual category can be named differently. Ultimately, categories may be created by the e-commerce system 102 so that characteristics of existing items can be used to determine user preferences and so that the user preferences can be used to identify items in which the user is likely interested. As described above, such technologies save computing resources because the wearable device 108 and/or the e-commerce system 102 are made aware of what user(s) prefer, and in turn, the wearable device 108 and/or the e-commerce system 102 no longer have to display multiple item recommendations to find one that the user likes.

Figure 3A:
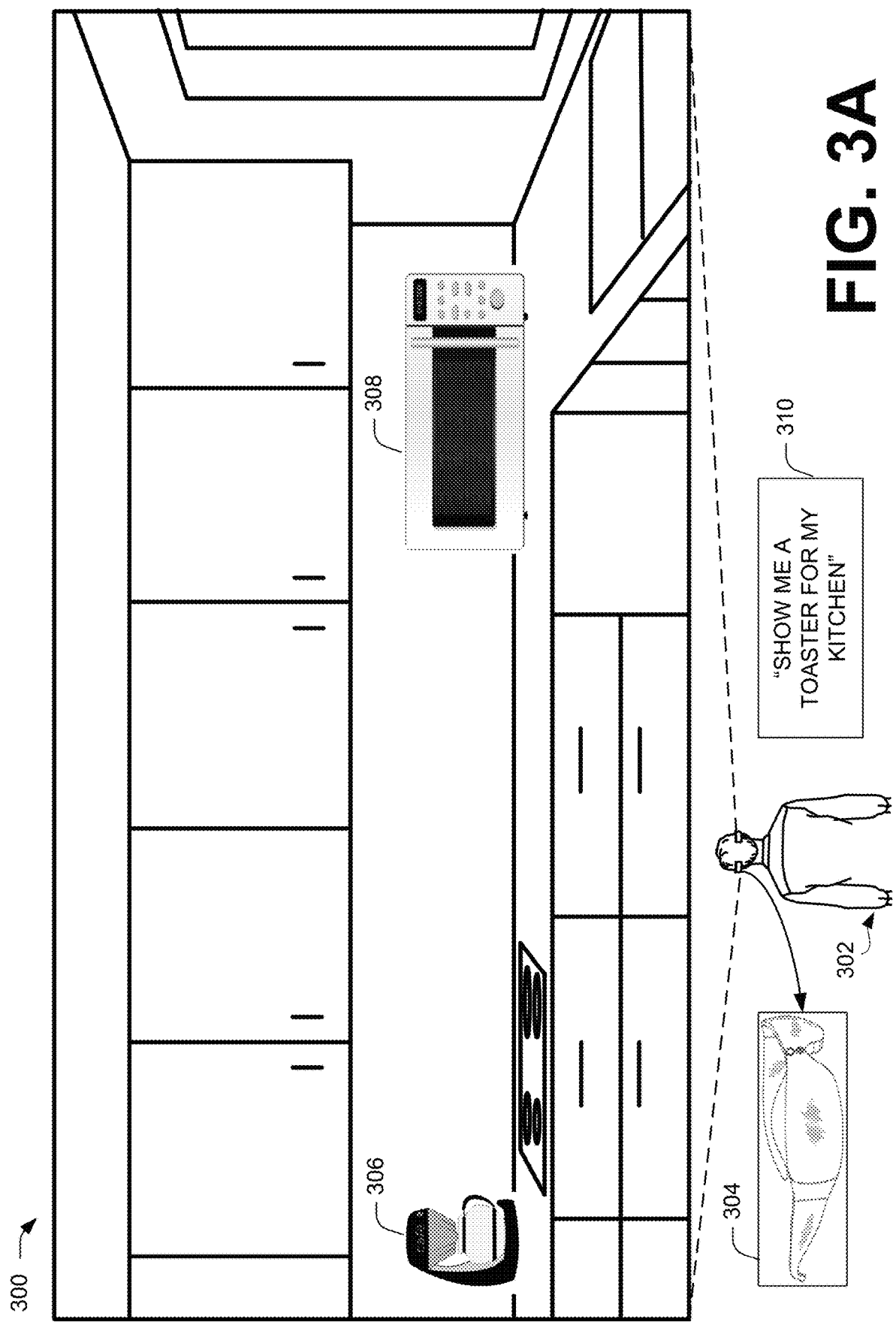
FIG. 3A illustrates an example where a user is looking at a portion of a real-world environment (e.g., a kitchen) while wearing a wearable device configured to recognize existing items and/or determine characteristics of the existing items.

FIG. 3A illustrates an example 300 where a user 302 (e.g., user 106) is looking at a portion of a real-world environment (e.g., a kitchen) while wearing a wearable device 304 (e.g., wearable device 108) configured to recognize existing items and/or determine characteristics of the existing items. The view into the kitchen provided via the wearable device 304 comprises a real-world view from the perspective of the user 302. As shown, the kitchen includes a coffee maker 306 and a microwave 308, which are existing items physical present in the kitchen. In this example 300, the user 302 can provide input 310, such as an audible command that states: "Show me a toaster for my kitchen". In response, the wearable device 304 can be configured to scan the kitchen to recognize existing items which include the coffee maker 306 and the microwave 308, as well as characteristics of the existing items (e.g., a size, a color, a brand, a price, etc.). The wearable device 304 may then transmit the existing items and/or the characteristics to the e-commerce system 102 so that the characteristics can be used to determine user preferences.

Figure 3B:
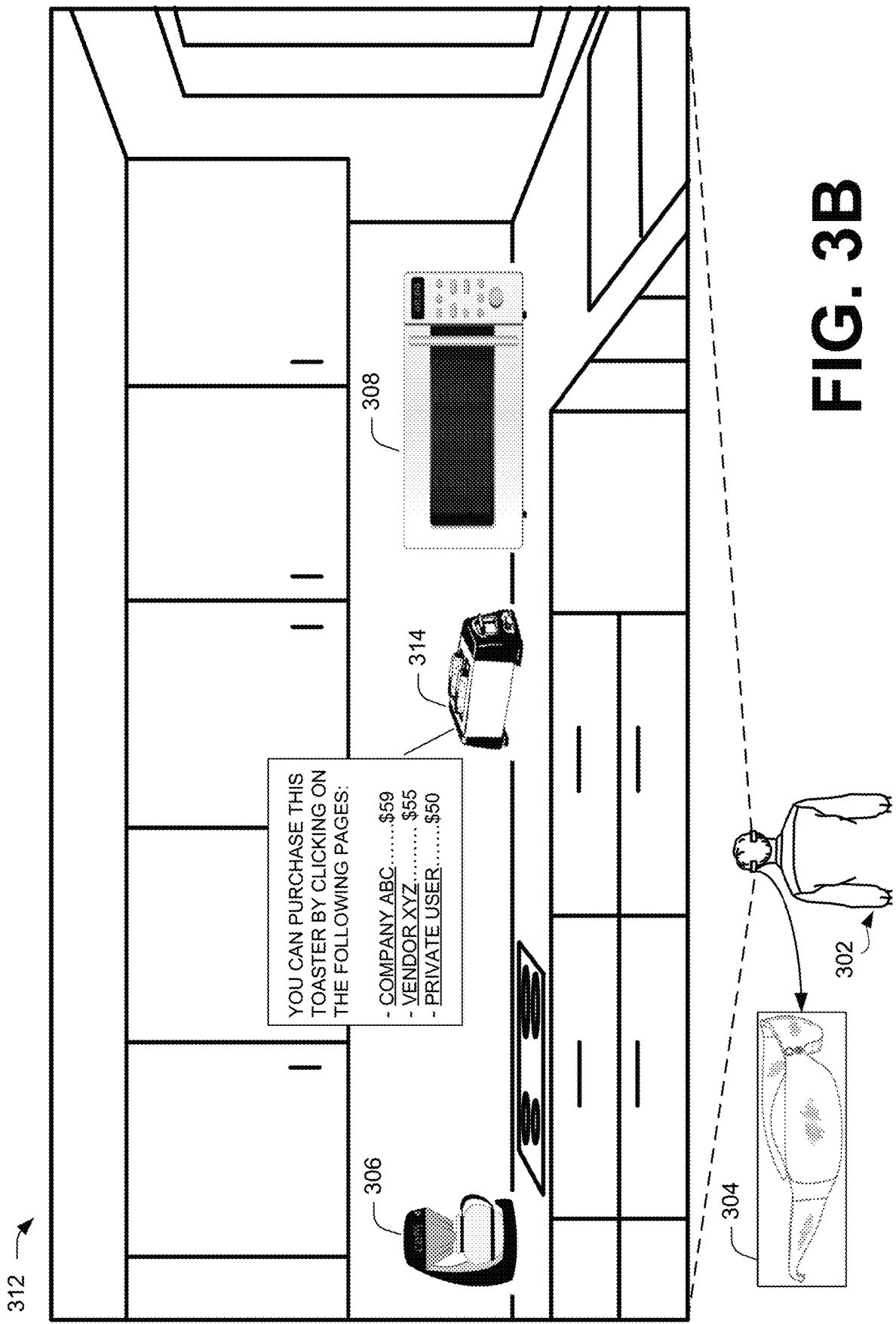
FIG. 3B illustrates an example of how a recommended item is rendered for display based on user preferences with regard to item characteristics.

FIG. 3B illustrates an example 312 of how a recommended item is rendered for display based on the user preferences. As described above, via the network(s) 118 and the e-commerce system 102, an item catalog 104 can be accessed to identify an item the user is likely interested in purchasing. The item can include characteristics that correlate to the user preferences (e.g., same or similar price category, same or similar size category, same or similar brand, same or similar color, an item that fits within a decorative theme, etc.). In the example 312, the wearable device 304 can virtually render a toaster 314 for display on the kitchen counter between the coffee pot 306 and the microwave 308. The toaster 314 can have characteristics that are the same or similar to those of the coffee pot 306 and the microwave 308. Moreover, item metadata for the toaster 314 can be displayed as well. In a specific example, the item metadata can include different merchants and/or users from which the toaster 314 can be purchased, as well as the prices (e.g., Company ABC is selling the toaster for $59, Vendor XYZ is selling the toaster for $55, Private User is selling the toaster for $50). The item metadata can be selectable so that the user can select one of the sellers of the toaster 314 and be taken to an item profile page of the seller so that the item can be directly purchased.

Figure 4:
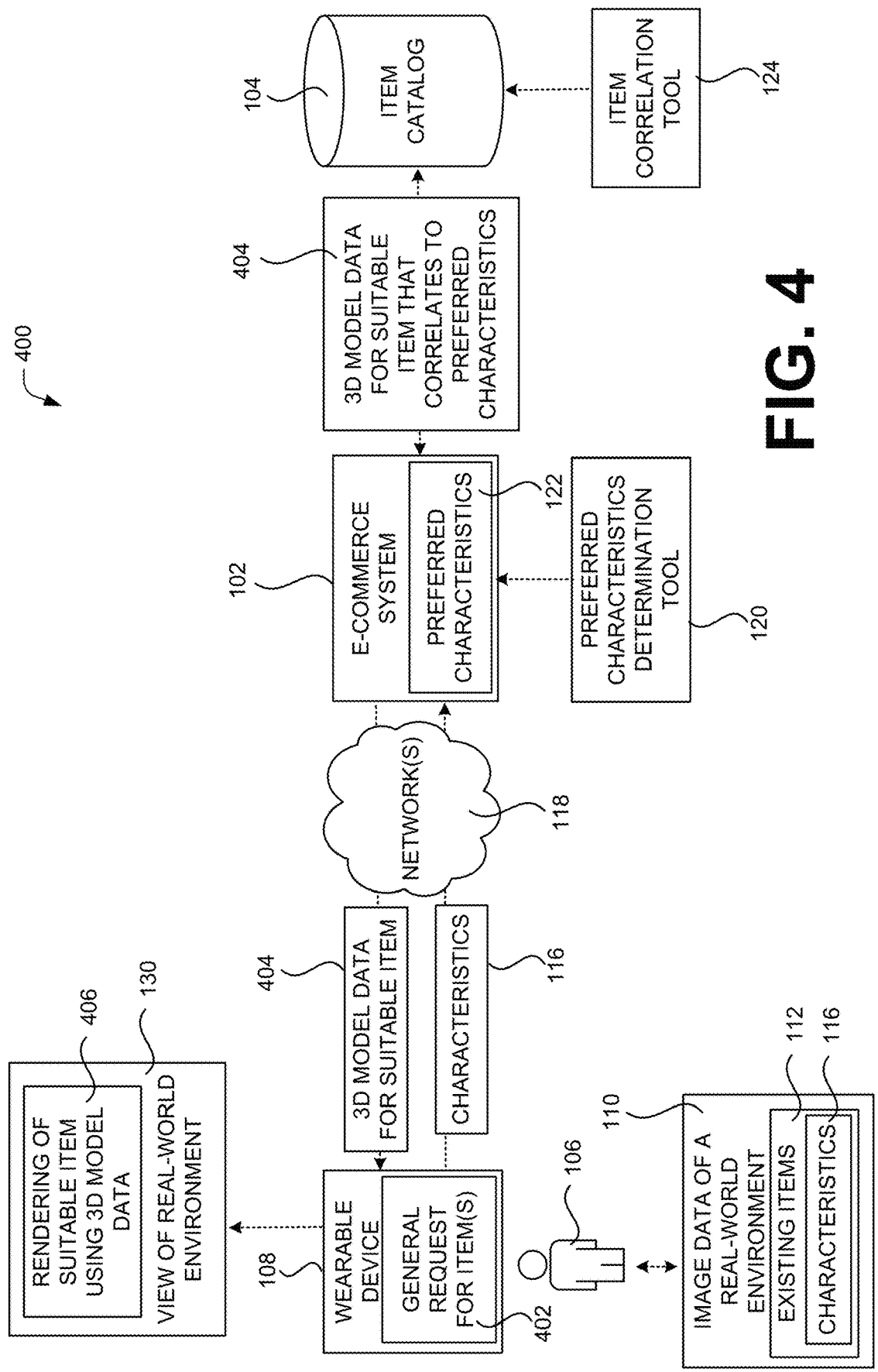
FIG. 4 illustrates aspects of another exemplary computing environment in which a system can cause a 3D model of an item to be rendered, for display, based on characteristics of items that already exist in a real-world environment in which a user is located.

FIG. 4 illustrates aspects of another exemplary computing environment 400 in which a system can cause a 3D model of an item to be rendered, for display, based on characteristics of items that already exist in a real-world environment in which a user is located. The environment 400 of FIG. 4 is similar to the environment 100 in FIG. 1. However, while the environment 100 of FIG. 1 receives a request for a specific item from the user 106 (e.g., the request clearly identifies an item of interest to the user), the environment 400 of FIG. 4 receives a general request for one or more items 402 from the user 106.

A general request may not identify a specific item, but rather, may suggest an event or reason for item recommendations to be displayed within a real-world environment. For example, a parent can enter a child's room and ask the wearable device 108 to recommend a gift for the child's upcoming birthday. In response, the wearable device 108 can scan the child's room to determine characteristics 116 of existing items 112 and send the characteristics 116 to the e-commerce system 102 over the network(s) 118. In another example, while viewing the living room in a house, a user can provide input that identifies a theme or a style along with a request for item recommendations. More specifically, the user may want to entertain family and friends for an event, and thus, may request that the wearable device 108 virtually decorate the living room with items for the event (e.g., Christmas, Thanksgiving, a birthday party, a big sports game between Team A and Team B, etc.).

As described above, upon receiving the characteristics 116 based on the general request for one or more items 402, the e-commerce system 102 can employ a preferred characteristics determination tool 120 to determine preferred characteristics 122 for the real-world environment. That is, based on an analysis of the characteristics 116 of the existing items 112, the preferred characteristics determination tool 120 may determine a preferred decorative theme or style for the real-world environment (e.g., a sports them for a child's room, a ballerina theme for a child's room, a cowboy theme for a child's room, etc.), a preferred brand of items (e.g., a child that loves sports may prefer UNDER ARMOUR over NIKE, etc.), a preferred price category for items (e.g., whether residents in the house typically purchase expensive or inexpensive items), a preferred color or color scheme for items, a preferred size for items, and so forth.

Based on the preferred characteristics 122, the e-commerce system 102 can identify one or more suitable items that satisfy the general request 402 received from the user 106 (e.g., an item that has characteristics that correlate to the preferred characteristics 122 and that are related to an event specified by the user). The e-commerce system 102 can then retrieve 3D model data for a suitable item 404 from the item catalog and send the 3D model data for the suitable item 404 to the wearable device 108 so that it can be used to display a rendering of the suitable item 406. Expanding on the examples provided above, the suitable item can be a child's birthday gift that complements existing items and/or fits within the decorative style or theme of the child's room. Moreover, multiple suitable items may virtually show the user 106 how the living room can be populated with items to reflect a theme or style associated with an event.

Figure 5:
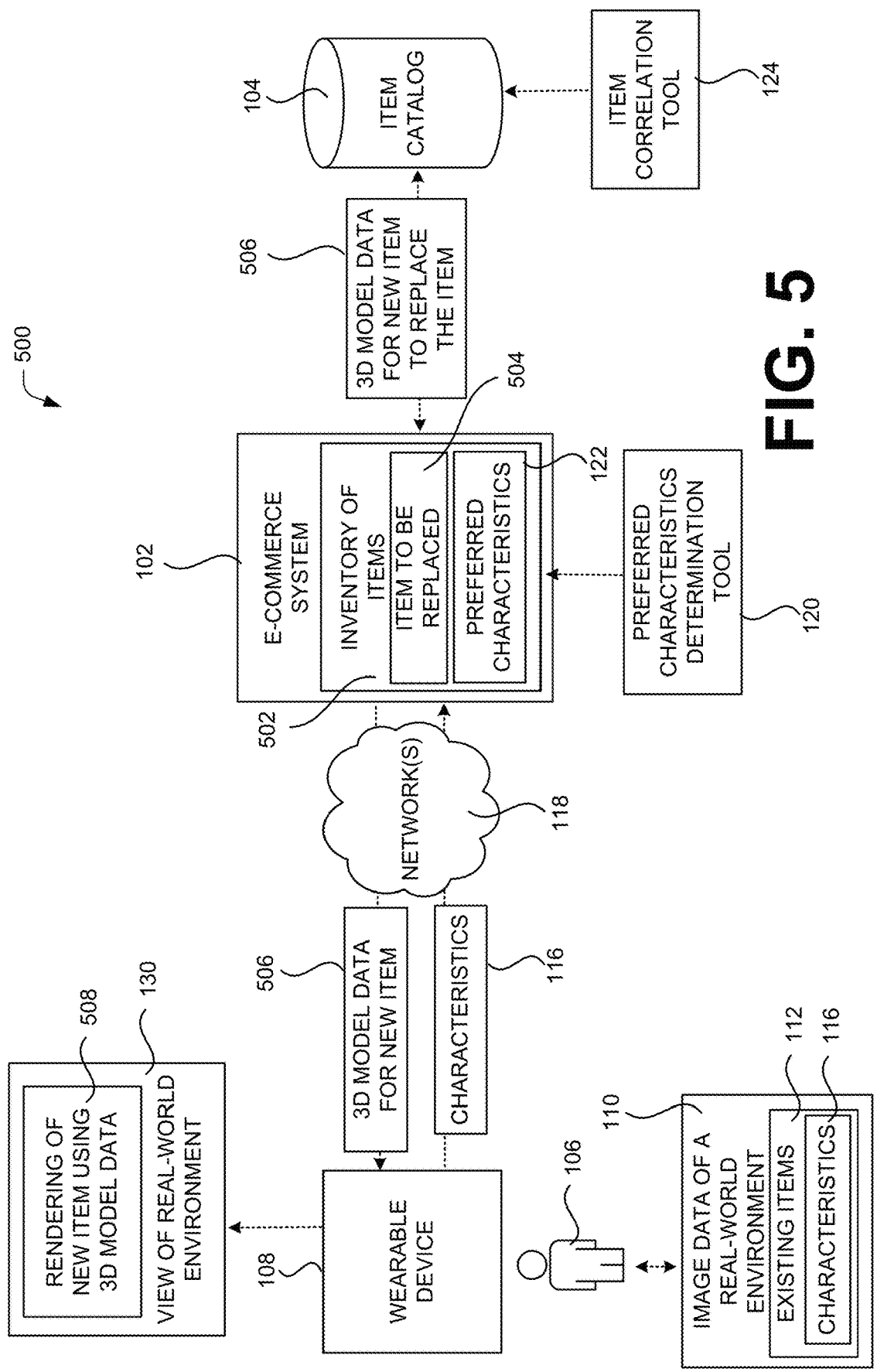
FIG. 5 illustrates aspects of yet another exemplary computing environment in which a system can cause a 3D model of an item to be rendered, for display, based on characteristics of items that already exist in a real-world environment in which a user is located.

FIG. 5 illustrates aspects of yet another exemplary computing environment 500 in which a system can cause a 3D model of an item to be rendered, for display, based on characteristics of items that already exist in a real-world environment in which a user is located. The environment 500 of FIG. 5 is similar to the environment 100 in FIG. 1. However, the environment 500 of FIG. 5 does not receive any requests for items from the user 106. Rather the wearable device 108 and/or the e-commerce system 102 in FIG. 5 are configured to automatically and continually create and maintain an inventory of items 502 that belong to, or are owned by, the user 106 or residents in a home (e.g., a family). The inventory of items 502 may include a current and/or permanent location of an item in a space the user 106 resides or spends a lot of time (e.g., an appliance in a kitchen, a flat screen television in a living room, a printer in an office, etc.).

For example, as the user 106 walks around his or her home while wearing the wearable device 108, the wearable device 108 can perform object recognition to identify items owned by the user 106. The wearable device 108 can then cause the identified items to be stored in an inventory 502 (e.g., a home inventory, a work inventory, a vacation place inventory, etc.). In some instances, a separate inventory can be created and maintained for individual real-world environments (e.g., an inventory for each of the living room, the garage, the kitchen, the master bedroom, a secondary bedroom, etc.).

In the example of FIG. 5, the wearable device 108 and/or the e-commerce system 102 is configured to proactively track and/or log information useable to determine if an item should be replaced. This information can include an age of an item (e.g., how old an item is), a total number of uses of an item, a frequency of use of an item, and/or other information indicative of usage. The wearable device 108 and/or the e-commerce system 102 can use this information to determine an item that may need to be replaced 504 before it breaks or fails. Thus, the wearable device 108 and/or the e-commerce system 102 can identify an opportune time to recommend that the user 106 replace the item (e.g., an old or an overused item) with a new item.

In some examples, the wearable device 108 and/or the e-commerce system 102 can access usage information (e.g., an expected life such as five or ten years, an amount of use such as one hundred uses or one thousand uses, etc.) provided by a manufacturer of an item to determine when the item may likely fail and/or break. Thus, the wearable device 108 and/or the e-commerce system 102 can recommend that the item be replaced prior to a time when the item is likely to fail and/or break, or when the item is nearing an end of its expected life.

The wearable device 108 and/or the e-commerce system 102 can then use the preferred characteristics 122 to identify a new item to replace an old item and to retrieve 3D model data for the new item 506 from the item catalog. Upon sending the 3D model data for the new item 506, the wearable device, in turn, can display a rendering of the new item 508 in a view of the real-world environment 130 using the 3D model data.

Figure 6:
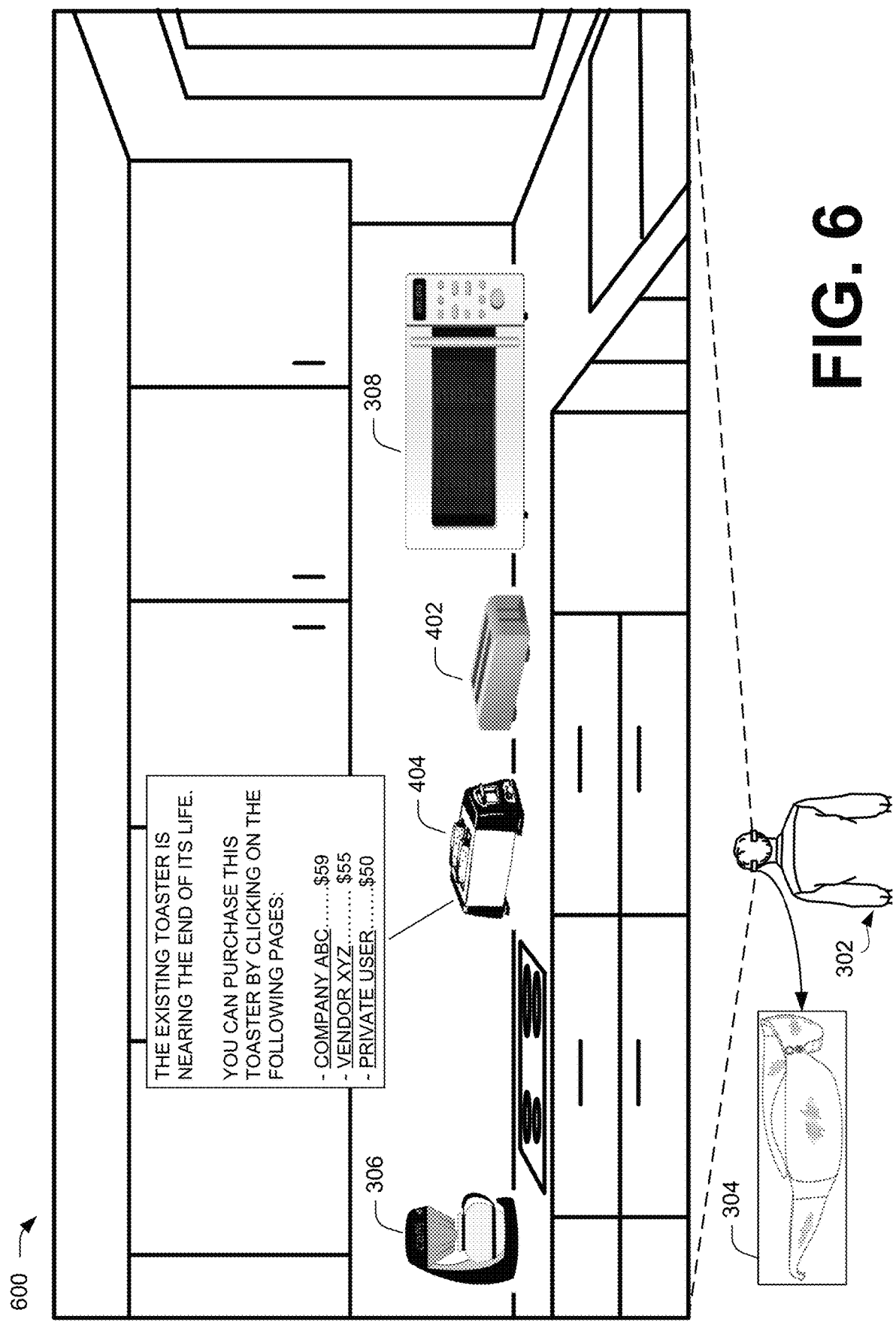
FIG. 6 illustrates another example where a user is looking at a portion of a real-world environment (e.g., a kitchen) while wearing a wearable device configured to recognize existing items, determine characteristics of the existing items, and recommend that an old item be replaced with a new item because the old item is nearing an end of its expected life.

Using the example of FIGS. 3A and 3B as a starting point, FIG. 6 illustrates another example 600 where a user 302 is looking at a portion of a real-world environment (e.g., a kitchen) while wearing a wearable device 304 configured to recognize existing items and/or determine characteristics of the existing items. In this example, the wearable device 304 is configured to determine that an existing toaster 402 is nearing the end of its life, and therefore, the wearable device 304 and/or the e-commerce system 102 can recommend a new toaster 404. This determination can be made without any input from the user. Rather, the wearable device 304 can automatically track usage of the items and/or log the usage in the inventory of items so that a new toaster can be recommended for purchase at a time when the old toaster should be replaced. The new toaster 404 can have characteristics that are the same or similar to those of the coffee pot 306 and the microwave 308.

To implement some of the described techniques on the wearable device 108, a user may be required to enable a feature and/or enter a particular operation mode. For example, the user 106 may need to provide permission and/or authorization for the wearable device 108 to implement the described techniques.

Figure 7:
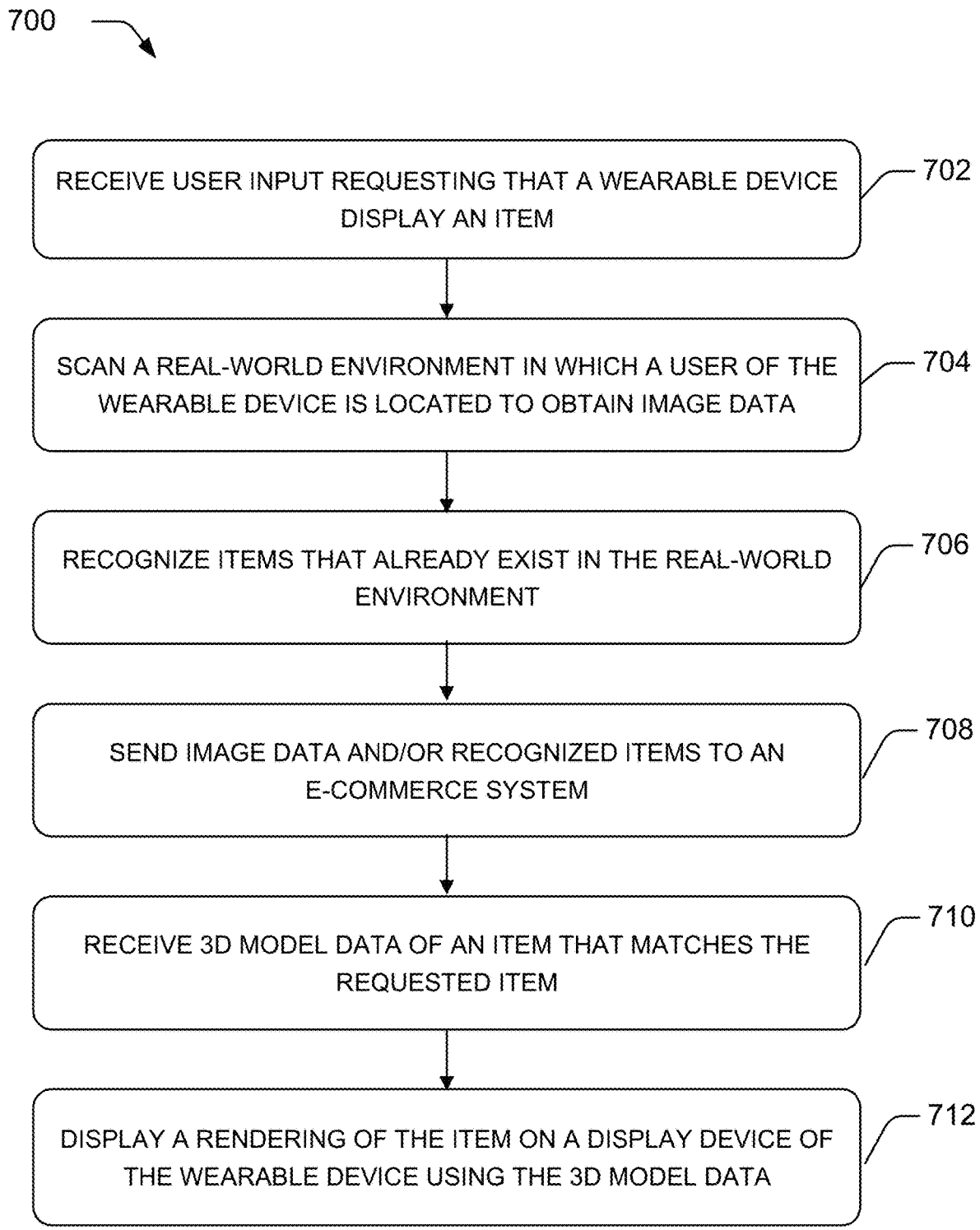
FIG. 7 is a flow diagram that illustrates an example process describing aspects of the technologies disclosed herein for recognizing objects that exist in a real-world environment.
Figure 8:
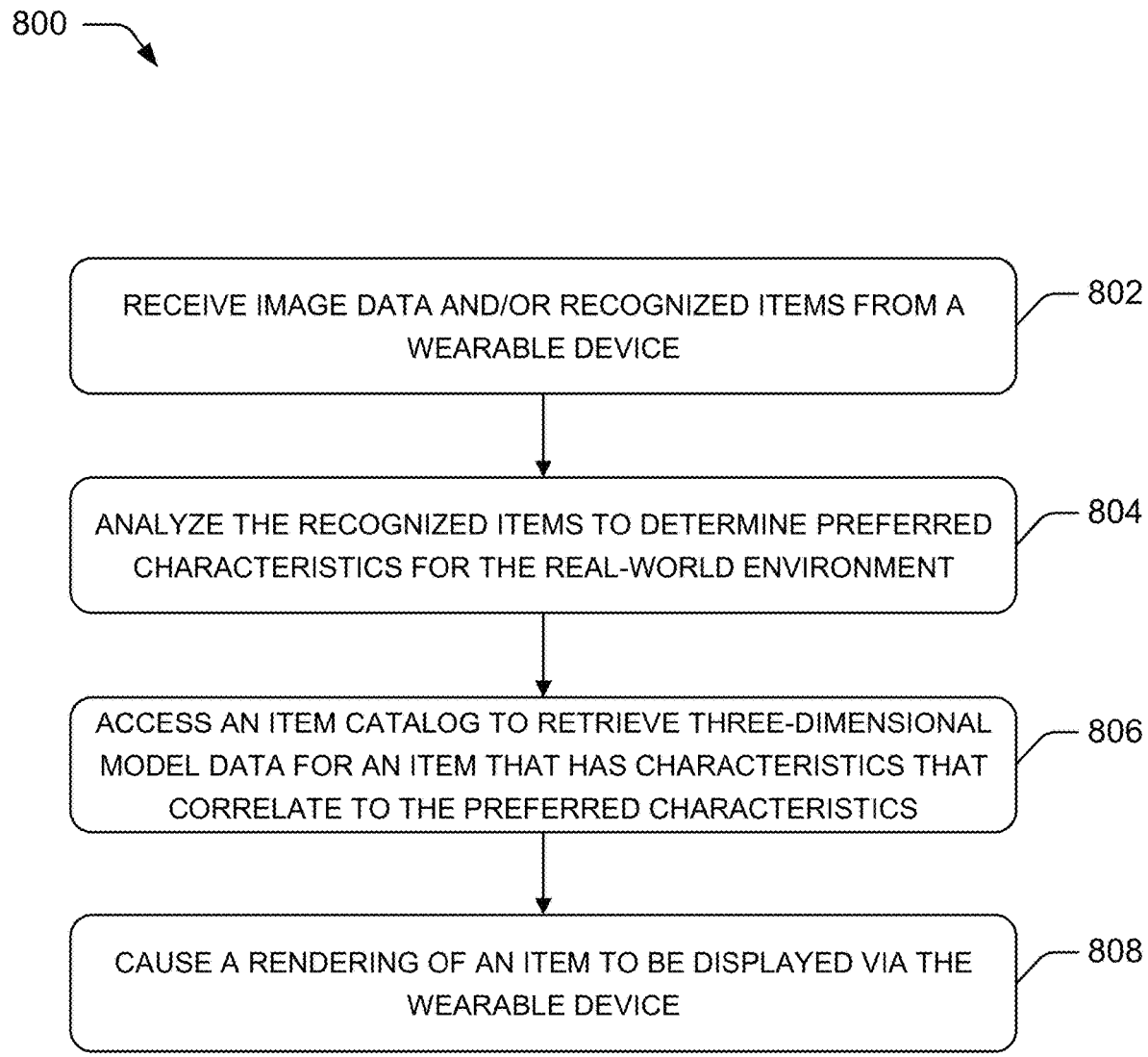
FIG. 8 is a flow diagram that illustrates an example process describing aspects of the technologies disclosed herein for determining preferred characteristics of a user based on the recognized objects.

FIGS. 7 and 8 are flow diagrams that each illustrate an example process describing aspects of the technologies presented herein with reference to FIGS. 1-6. A process is illustrated as a collection of blocks in a logical flow graph, which represent a sequence of operations that can be implemented in hardware, software, or a combination thereof. In the context of software, the blocks represent computer-executable instructions that, when executed by one or more processors, perform the recited operations.

The particular implementation of the technologies disclosed herein is a matter of choice dependent on the performance and other requirements of a computing device such as a wearable device. Accordingly, the logical operations described herein may be referred to variously as states, operations, structural devices, acts, or modules. These states, operations, structural devices, acts, and modules can be implemented in hardware, software (i.e. computer-executable instructions), firmware, in special-purpose digital logic, and any combination thereof. Generally, computer-executable instructions include routines, programs, objects, components, data structures, and the like that perform or implement particular functions. It should be appreciated that more or fewer operations can be performed than shown in the figures and described herein. These operations can also be performed in a different order than those described herein. Other processes described throughout this disclosure shall be interpreted accordingly.

FIG. 7 is a flow diagram that illustrates an example process 700 describing aspects of the technologies disclosed herein for recognizing objects that exist in a real-world environment and determining preferred characteristics of a user based on the recognized objects.

The process 700 begins at block 702, where user input is received. The user input can specify a request to display an item (e.g., a specific request, a general request, etc.). Based on the user input, the process proceeds to block 704 where an optical device of the wearable device scans the real-world environment to obtain image data. At block 706, the wearable device may recognize items that already exist in the real-world environment. The process 700 then proceeds to block 708 where the image data and/or the recognized items are sent to an e-commerce system. At block 710, 3D model data of an item that matches the requested item is received. At block 712, a rendering of the item is displayed on a display device of the wearable device using the 3D model data.

FIG. 8 is a flow diagram that illustrates an example process 800 describing aspects of the technologies disclosed herein for determining preferred characteristics of a user based on the recognized objects.

The process 800 begins at block 802, where image data of a real-world environment and/or recognized items that exist in the real-world environment are received from a wearable device of a user. The process proceed to block 804 where the e-commerce system analyzes the real-world items that exist in the real-world environment to determine preferred characteristics for the real-world environment. At block 806, an item catalog is accessed to retrieve three-dimensional model data for an item that has characteristics that correlate to the preferred characteristics. At block 808, a rendering of the item is caused to be displayed on a display device of the wearable device of the user. For instance, 3D model data of the item is transmitted from the e-commerce system 102 to the wearable device 108.

Figure 9:
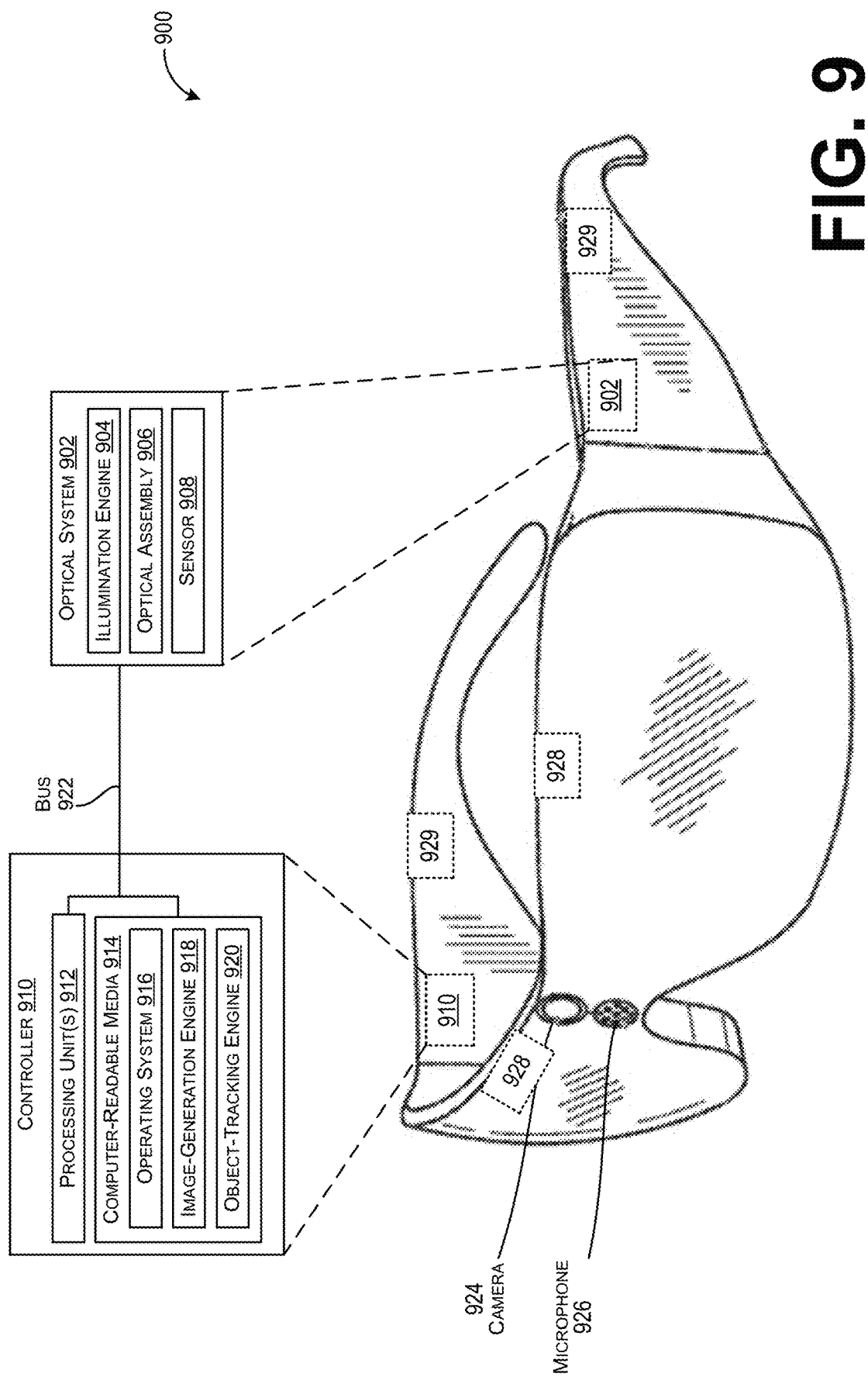
FIG. 9 shows an illustrative configuration of a wearable device capable of implementing aspects of the technologies disclosed herein.

FIG. 9 shows an illustrative configuration of a wearable device 900 (e.g., a headset system, a head-mounted display, etc.) capable of implementing aspects of the technologies disclosed herein. The wearable device 900 includes an optical system 902 with an illumination engine 904 to generate electro-magnetic ("EM") radiation that includes both a first bandwidth for generating computer-generated ("CG") images and a second bandwidth for tracking physical objects. The first bandwidth may include some or all of the visible-light portion of the EM spectrum whereas the second bandwidth may include any portion of the EM spectrum that is suitable to deploy a desired tracking protocol.

In the example configuration, the optical system 902 further includes an optical assembly 906 that is positioned to receive the EM radiation from the illumination engine 904 and to direct the EM radiation (or individual bandwidths of thereof) along one or more predetermined optical paths. For example, the illumination engine 904 may emit the EM radiation into the optical assembly 906 along a common optical path that is shared by both the first bandwidth and the second bandwidth. The optical assembly 906 may also include one or more optical components that are configured to separate the first bandwidth from the second bandwidth (e.g., by causing the first and second bandwidths to propagate along different image-generation and object-tracking optical paths, respectively).

The optical assembly 906 includes components that are configured to direct the EM radiation with respect to one or more components of the optical assembly 906 and, more specifically, to direct the first bandwidth for image-generation purposes and to direct the second bandwidth for object-tracking purposes. In this example, the optical system 902 further includes a sensor 908 to generate object data in response to a reflected-portion of the second bandwidth, i.e. a portion of the second bandwidth that is reflected off an object that exists within a real-world environment.

In various configurations, the wearable device 900 may utilize the optical system 902 to generate a composite view (e.g., from a perspective of a user 106 that is wearing the wearable device 900) that includes both one or more CG images and a view of at least a portion of the real-world environment that includes the object. For example, the optical system 902 may utilize various technologies such as, for example, AR technologies to generate composite views that include CG images superimposed over a real-world view. As such, the optical system 902 may be configured to generate CG images via a display panel. The display panel can include separate right eye and left eye transparent display panels.

Alternatively, the display panel can include a single transparent display panel that is viewable with both eyes and/or a single transparent display panel that is viewable by a single eye only. Therefore, it can be appreciated that the technologies described herein may be deployed within a single-eye Near Eye Display ("NED") system (e.g., GOOGLE GLASS) and/or a dual-eye NED system (e.g., OCULUS RIFT). The wearable device 900 is an example device that is used to provide context and illustrate various features and aspects of the user interface display technologies and systems disclosed herein. Other devices and systems may also use the interface display technologies and systems disclosed herein.

The display panel may be a waveguide display that includes one or more diffractive optical elements ("DOEs") for in-coupling incident light into the waveguide, expanding the incident light in one or more directions for exit pupil expansion, and/or out-coupling the incident light out of the waveguide (e.g., toward a user's eye). In some examples, the wearable device 1200 may further include an additional see-through optical component.

In the illustrated example of FIG. 9, a controller 910 is operatively coupled to each of the illumination engine 904, the optical assembly 906 (and/or scanning devices thereof) and the sensor 908. The controller 910 includes one or more logic devices and one or more computer memory devices storing instructions executable by the logic device(s) to deploy functionalities described herein with relation to the optical system 902. The controller 910 can comprise one or more processing units 912, one or more computer-readable media 914 for storing an operating system 916 and data such as, for example, image data that defines one or more CG images and/or tracking data that defines one or more object tracking protocols.

The computer-readable media 914 may further include an image-generation engine 918 that generates output signals to modulate generation of the first bandwidth of EM radiation by the illumination engine 904 and also to control the scanner(s) to direct the first bandwidth within the optical assembly 906. Ultimately, the scanner(s) direct the first bandwidth through a display panel to generate CG images that are perceptible to a user, such as a user interface.

The computer-readable media 914 may further include an object-tracking engine 920 that generates output signals to modulate generation of the second bandwidth of EM radiation by the illumination engine 904 and also the scanner(s) to direct the second bandwidth along an object-tracking optical path to irradiate an object. The object tracking engine 920 communicates with the sensor 908 to receive the object data that is generated based on the reflected-portion of the second bandwidth.

The object tracking engine 920 then analyzes the object data to determine one or more characteristics of the object such as, for example, a depth of the object with respect to the optical system 902, an orientation of the object with respect to the optical system 902, a velocity and/or acceleration of the object with respect to the optical system 902, or any other desired characteristic of the object. The components of the wearable device 900 are operatively connected, for example, via a bus 922, which can include one or more of a system bus, a data bus, an address bus, a PCI bus, a Mini-PCI bus, and any variety of local, peripheral, and/or independent buses.

The wearable device 900 may further include various other components, for example cameras (e.g., camera 924), microphones (e.g., microphone 926), accelerometers, gyroscopes, magnetometers, temperature sensors, touch sensors, biometric sensors, other image sensors, energy-storage components (e.g. battery), a communication facility, a GPS receiver, etc. Furthermore, the wearable device 900 can include one or more eye gaze sensors 928. In at least one example, an eye gaze sensor 928 is user facing and is configured to track the position of at least one eye of a user. Accordingly, eye position data (e.g., determined via use of eye gaze sensor 928), image data (e.g., determined via use of the camera 924), and other data can be processed to identify a gaze path of the user. That is, it can be determined that the user is looking at a particular section of a hardware display surface, a particular real-world object or part of a real-world object in the view of the user, and/or a rendered object or part of a rendered object displayed on a hardware display surface.

In some configurations, the wearable device 900 can include an actuator 929. The processing units 912 can cause the generation of a haptic signal associated with a generated haptic effect to actuator 929, which in turn outputs haptic effects such as vibrotactile haptic effects, electrostatic friction haptic effects, or deformation haptic effects. Actuator 929 includes an actuator drive circuit. The actuator 929 may be, for example, an electric motor, an electro-magnetic actuator, a voice coil, a shape memory alloy, an electroactive polymer, a solenoid, an eccentric rotating mass motor ("ERM"), a linear resonant actuator ("LRA"), a piezoelectric actuator, a high bandwidth actuator, an electroactive polymer ("EAP") actuator, an electrostatic friction display, or an ultrasonic vibration generator.

In alternate configurations, wearable device 900 can include one or more additional actuators 929. The actuator 929 is an example of a haptic output device, where a haptic output device is a device configured to output haptic effects, such as vibrotactile haptic effects, electrostatic friction haptic effects, or deformation haptic effects, in response to a drive signal. In alternate configurations, the actuator 929 can be replaced by some other type of haptic output device. Further, in other alternate configurations, wearable device 900 may not include actuator 929, and a separate device from wearable device 900 includes an actuator, or other haptic output device, that generates the haptic effects, and wearable device 900 sends generated haptic signals to that device through a communication device.

The processing unit(s) 912, can represent, for example, a CPU-type processing unit, a GPU-type processing unit, a field-programmable gate array ("FPGA"), another class of digital signal processor ("DSP"), or other hardware logic components that may, in some instances, be driven by a CPU. For example, and without limitation, illustrative types of hardware logic components that can be used include Application-Specific Integrated Circuits ("ASICs"), Application-Specific Standard Products ("ASSPs"), System-on-a-Chip Systems ("SOCs"), Complex Programmable Logic Devices ("CPLDs"), etc.

As used herein, computer-readable media, such as computer-readable media 914, can store instructions executable by the processing unit(s) 922. Computer-readable media can also store instructions executable by external processing units such as by an external CPU, an external GPU, and/or executable by an external accelerator, such as an FPGA type accelerator, a DSP type accelerator, or any other internal or external accelerator. In various examples, at least one CPU, GPU, and/or accelerator is incorporated in a computing device, while in some examples one or more of a CPU, GPU, and/or accelerator is external to a computing device.

In various examples, the wearable device 900 is configured to interact, via network communications, with a network device (e.g., a network server or a cloud server) to implement the configurations described herein. For instance, the wearable device 900 may collect data and send the data over network(s) to the network device. The network device may then implement some of the functionality described herein. Subsequently, the network device can cause the wearable device 900 to display an item and/or instruct the wearable device 900 to perform a task.

Computer-readable media can include computer storage media and/or communication media. Computer storage media can include one or more of volatile memory, non-volatile memory, and/or other persistent and/or auxiliary computer storage media, removable and non-removable computer storage media implemented in any method or technology for storage of information such as computer-readable instructions, data structures, program modules, or other data. Thus, computer storage media includes tangible and/or physical forms of media included in a device and/or hardware component that is part of a device or external to a device, including but not limited to random access memory ("RAM"), static random-access memory ("SRAM"), dynamic random-access memory ("DRAM"), phase change memory ("PCM"), read-only memory ("ROM"), erasable programmable read-only memory ("EPROM"), electrically erasable programmable read-only memory ("EEPROM"), flash memory, rotating media, optical cards or other optical storage media, magnetic storage, magnetic cards or other magnetic storage devices or media, solid-state memory devices, storage arrays, network attached storage, storage area networks, hosted computer storage or any other storage memory, storage device, and/or storage medium that can be used to store and maintain information for access by a computing device.

In contrast to computer storage media, communication media can embody computer-readable instructions, data structures, program modules, or other data in a modulated data signal, such as a carrier wave, or other transmission mechanism. As defined herein, computer storage media does not include communication media. That is, computer storage media does not include communications media consisting solely of a modulated data signal, a carrier wave, or a propagated signal, per se.

In accordance with examples described herein, the wearable device 108 can also be configured to use network communications to interact with an e-commerce provider of an electronic marketplace. To implement the electronic marketplace, the e-commerce provider creates and maintains catalog(s) of items. The items can be bought and/or sold by registered users and/or merchants. Accordingly, the e-commerce provider can comprise resources to collect and store information related to an item, to display the information related to the item to a potential buyer, to conduct online auctions of an item, to match a buyer of an item with a seller of the item, to process a transaction, etc.

Figure 10:
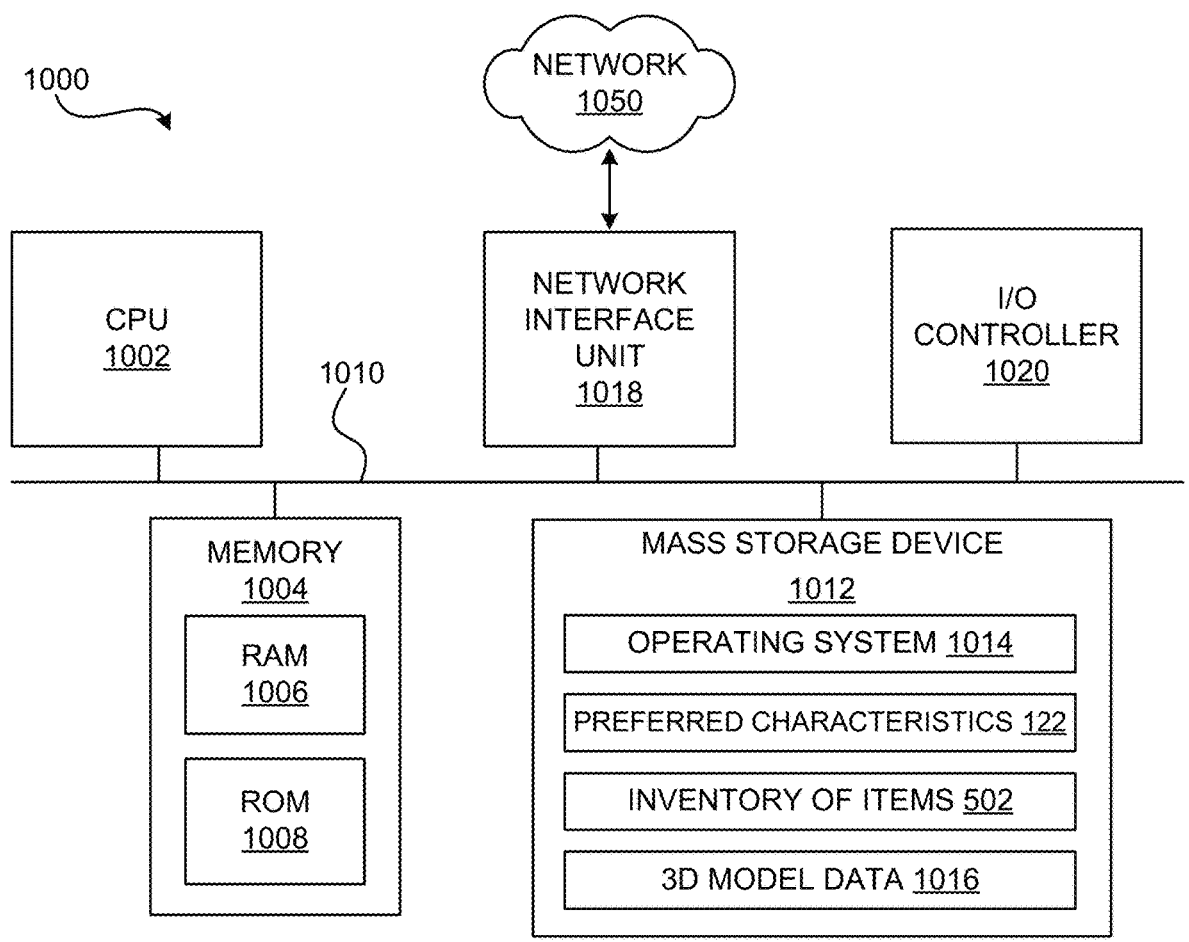
FIG. 10 illustrates additional details of an example computer architecture for a computer capable of implementing aspects of the technologies described herein.

FIG. 10 shows additional details of an example computer architecture for a computer capable of executing the functionalities described herein such as, for example, those described with reference to FIGS. 1-9, or any program components thereof as described herein. Thus, the computer architecture 1000 illustrated in FIG. 10 illustrates an architecture for a server computer, or network of server computers, or any other type of computing device suitable for implementing the functionality described herein. The computer architecture 1000 may be utilized to execute any aspects of the software components presented herein, such as software components for implementing the e-commerce system 102, including the preferred characteristics determination tool 120 and/or the item correlation tool 124.

The computer architecture 1000 illustrated in FIG. 10 includes a central processing unit 1002 ("CPU"), a system memory 1004, including a random-access memory 1006 ("RAM") and a read-only memory ("ROM") 1008, and a system bus 1010 that couples the memory 1004 to the CPU 1002. A basic input/output system containing the basic routines that help to transfer information between elements within the computer architecture 1000, such as during startup, is stored in the ROM 1008. The computer architecture 1000 further includes a mass storage device 1012 for storing an operating system 1014, other data, and one or more application programs. For example, the mass storage device 1012 may store preferred characteristics 122, an inventory of items 502, as well as 3D model data 1016 for items.

The mass storage device 1012 is connected to the CPU 1002 through a mass storage controller (not shown) connected to the bus 1010. The mass storage device 1012 and its associated computer-readable media provide non-volatile storage for the computer architecture 1000. Although the description of computer-readable media contained herein refers to a mass storage device, such as a solid-state drive, a hard disk or CD-ROM drive, it should be appreciated by those skilled in the art that computer-readable media can be any available computer storage media or communication media that can be accessed by the computer architecture 1000.

According to various implementations, the computer architecture 1000 may operate in a networked environment using logical connections to remote computers through a network 1050. The computer architecture 1000 may connect to the network 1050 through a network interface unit 1018 connected to the bus 1010. It should be appreciated that the network interface unit 1018 also may be utilized to connect to other types of networks and remote computer systems. The computer architecture 1000 also may include an input/output controller 1020 for receiving and processing input from a number of other devices, including a keyboard, mouse, or electronic stylus. Similarly, the input/output controller 1020 may provide output to a display screen, a printer, or other type of output device. It should also be appreciated that a computing system can be implemented using the disclosed computer architecture 1000 to communicate with other computing systems.

It should be appreciated that the software components described herein may, when loaded into the CPU 1002 and executed, transform the CPU 1002 and the overall computer architecture 1000 from a general-purpose computing system into a special-purpose computing system customized to facilitate the functionality presented herein. The CPU 1002 may be constructed from any number of transistors or other discrete circuit elements, which may individually or collectively assume any number of states. More specifically, the CPU 1002 may operate as a finite-state machine, in response to executable instructions contained within the software modules disclosed herein. These computer-executable instructions may transform the CPU 1002 by specifying how the CPU 1002 transitions between states, thereby transforming the transistors or other discrete hardware elements constituting the CPU 1002.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the computer architecture 1000 in order to store and execute the software components presented herein. It also should be appreciated that the computer architecture 1000 may include other types of computing devices, including smartphones, embedded computer systems, tablet computers, other types of wearable computing devices, and other types of computing devices known to those skilled in the art. It is also contemplated that the computer architecture 1000 may not include all of the components shown in FIG. 10, may include other components that are not explicitly shown in FIG. 10, or may utilize an architecture completely different than that shown in FIG. 10.

Illustrative Configurations

The following clauses described multiple possible configurations for implementing the features described in this disclosure. The various configurations described herein are not limiting nor is every feature from any given configuration required to be present in another configuration. Any two or more of the configurations may be combined together unless the context clearly indicates otherwise. As used herein in this document "or" means and/or. For example, "A or B" means A without B, B without A, or A and B. As used herein, "comprising" means including listed all features and potentially including addition of other features that are not listed. "Consisting essentially of" means including the listed features and those additional features that do not materially affect the basic and novel characteristics of the listed features. "Consisting of" means only the listed features to the exclusion of any feature not listed.

The disclosure presented herein also encompasses the subject matter set forth in the following clauses.

Example Clause A, a method comprising: recognizing, based on image data obtained by a wearable device, real-world items that already exist in the environment; analyzing the real-world items that already exist in the environment to determine preferred characteristics for the environment, wherein the preferred characteristics include one or more of a price category, a size category, a brand, a color, or a decorative theme; accessing an item catalog to retrieve three-dimensional model data for an item that has characteristics that correlate to the preferred characteristics; and causing a rendering of the item to be displayed on a display device of the wearable device using the three-dimensional model data.

Example Clause B, the method of Example Clause A, wherein the preferred characteristics include the price category and the price category is determined relative to average prices of items in the item catalog.

Example Clause C, the method of Example Clause B, wherein the price category comprises one of an expensive price category representative of a user typically spending more than a threshold percentage above the average prices, a moderate price category representative of the user typically spending within the threshold percentage of the average prices, or an inexpensive price category representative of the user typically spending more than a threshold percentage below the average prices.

Example Clause D, the method of any one of Example Clauses A through C, wherein the preferred characteristics include the size category and the size category is determined relative to average sizes of items in the item catalog.

Example Clause E, the method of Example Clause D, wherein the size category comprises one of a large size category representative of a user preferring items that are a threshold percentage above the average sizes, a medium size category representative of the user preferring items that are within the threshold percentage of the average sizes, or a small size category representative of the user preferring items that are a threshold percentage below the average sizes.

Example Clause F, the method of any one of Example Clauses A through E, wherein recognizing the real-world items that already exist in the environment and analyzing the real-world items to determine the preferred characteristics for the environment are implemented in response to receiving a user input that specifically requests that the item be displayed in the environment.

Example Clause G, the method of Example Clause F, wherein the user input comprises a voice command.

Example Clause H, the method of any one of Example Clauses A through E, wherein recognizing the real-world items that already exist in the environment and analyzing the real-world items to determine the preferred characteristics for the environment are implemented in response to receiving a user input that generally requests for an item recommendation for a particular event.

Example Clause I, the method of Example Clause A, further comprising accessing information associated with a real-world item to determine the real-world item is to be replaced, wherein the information comprises a life expectancy for the real-world item or an amount of item uses for the real-world item, the rendering of the item to be displayed on the display device of the wearable device corresponding to the real-world item to be replaced in the environment.

Example Clause J, the method of any one of Example Clauses A through I, wherein the environment comprises a type of room in a personal residence or a business office.

Example Clause K, a system comprising: one or more processors; and a memory in communication with the one or more processors, the memory having computer-readable instructions stored thereupon which, when executed by the one or more processors, cause the one or more processors to: recognize, based on image data obtained by a wearable device, real-world items that already exist in the environment; analyze the real-world items that already exist in the environment to determine preferred characteristics for the environment; access an item catalog to retrieve three-dimensional model data for an item that has characteristics that correlate to the preferred characteristics; and cause a rendering of the item to be displayed on a display device of the wearable device using the three-dimensional model data.

Example Clause L, the system of Example Clause K, wherein the preferred characteristics include a price category and the price category is determined relative to average prices of items in the item catalog.

Example Clause M, the system of Example Clause L, wherein the price category comprises one of an expensive price category representative of a user typically spending more than a threshold percentage above the average prices, a moderate price category representative of the user typically spending within the threshold percentage of the average prices, or an inexpensive price category representative of the user typically spending more than a threshold percentage below the average prices.

Example Clause N, the system of any one of Example Clauses K through M, wherein the preferred characteristics include a size category and the size category is determined relative to average sizes of items in the item catalog.

Example Clause O, the system of Example Clause N, wherein the size category comprises one of a large size category representative of a user preferring items that are a threshold percentage above the average sizes, a medium size category representative of the user preferring items that are within the threshold percentage of the average sizes, or a small size category representative of the user preferring items that are a threshold percentage below the average sizes.

Example Clause P, the system of any one of Example Clauses K through O, wherein the preferred characteristics include a brand.

Example Clause Q, the system of any one of Example Clauses K through P, wherein the preferred characteristics include a decorative theme.

Example Clause R, the system of any one of Example Clauses K through Q, wherein recognizing the real-world items that already exist in the environment and analyzing the real-world items to determine the preferred characteristics for the environment are implemented in response to receiving a user input that specifically requests that the item be displayed in the environment.

Example Clause S, the system of any one of Example Clauses K through Q, wherein recognizing the real-world items that already exist in the environment and analyzing the real-world items to determine the preferred characteristics for the environment are implemented in response to receiving a user input that generally requests for an item recommendation for a particular event.

Example Clause T, one or more non-transitory computer-readable media having computer-readable instructions stored thereupon which, when executed by one or more processors, cause a system to: recognize, based on image data obtained by a wearable device, real-world items that already exist in the environment; analyze the real-world items that already exist in the environment to determine preferred characteristics for the environment, wherein the preferred characteristics include one or more of a price category, a size category, a brand, or a decorative theme; access an item catalog to retrieve three-dimensional model data for an item that has characteristics that correlate to the preferred characteristics; and cause a rendering of the item to be displayed on a display device of the wearable device using the three-dimensional model data.

CONCLUSION

For ease of understanding, the processes discussed in this disclosure are delineated as separate operations represented as independent blocks. However, these separately delineated operations should not be construed as necessarily order dependent in their performance. The order in which the process is described is not intended to be construed as a limitation, and any number of the described process blocks may be combined in any order to implement the process or an alternate process. Moreover, it is also possible that one or more of the provided operations is modified or omitted.

Although the subject matter has been described in language specific to structural features and/or methodological acts, it is to be understood that the subject matter defined in the appended claims is not necessarily limited to the specific features or acts described above. Rather, the specific features and acts are disclosed as example forms of implementing the claims.

The terms "a," "an," "the" and similar referents used in the context of describing the invention (especially in the context of the following claims) are to be construed to cover both the singular and the plural unless otherwise indicated herein or clearly contradicted by context. The terms "based on," "based upon," and similar referents are to be construed as meaning "based at least in part" which includes being "based in part" and "based in whole" unless otherwise indicated or clearly contradicted by context.

It should be appreciated that any reference to "first," "second," etc. users or other elements within the Summary and/or Detailed Description is not intended to and should not be construed to necessarily correspond to any reference of "first," "second," etc. elements of the claims. Rather, any use of "first" and "second" within the Summary and/or Detailed Description may be used to distinguish between two different instances of the same element (e.g., two different users, two different items, etc.).

Certain configurations are described herein, including the best mode known to the inventors for carrying out the invention. Of course, variations on these described configurations will become apparent to those of ordinary skill in the art upon reading the foregoing description. Skilled artisans will know how to employ such variations as appropriate, and the configurations disclosed herein may be practiced otherwise than specifically described. Accordingly, all modifications and equivalents of the subject matter recited in the claims appended hereto are included within the scope of this disclosure. Moreover, any combination of the above-described elements in all possible variations thereof is encompassed by the invention unless otherwise indicated herein or otherwise clearly contradicted by context.

What is claimed is:

1. A method comprising:
recognizing, based on image data obtained by a wearable device, real-world items that already exist in an environment;
determining preferred characteristics for the environment based on the real-world items recognized in the image data obtained by the wearable device, wherein the preferred characteristics determined based on the real-world items recognized in the image data obtained by the wearable device include a user preference for a particular price category;
accessing an item catalog to retrieve three-dimensional model data for an item that has characteristics that correlate to the preferred characteristics and is within the particular price category; and
causing a rendering of the item to be displayed on a display device of the wearable device using the three-dimensional model data.

2. The method of claim 1, wherein the particular price category is determined relative to average prices of items in the item catalog.

3. The method of claim 2, wherein the particular price category comprises one of an expensive price category representative of a user typically spending more than a threshold percentage above the average prices, a moderate price category representative of the user typically spending within the threshold percentage of the average prices, or an inexpensive price category representative of the user typically spending more than a threshold percentage below the average prices.

4. The method of claim 1, wherein the preferred characteristics further include a size category that is determined relative to average sizes of items in the item catalog.

5. The method of claim 4, wherein the size category comprises one of a large size category representative of a user preferring items that are a threshold percentage above the average sizes, a medium size category representative of the user preferring items that are within the threshold percentage of the average sizes, or a small size category representative of the user preferring items that are a threshold percentage below the average sizes.

6. The method of claim 1, wherein recognizing the real-world items that already exist in the environment and the determining the preferred characteristics for the environment are implemented in response to receiving a user input that specifically requests that the item be displayed in the environment.

7. The method of claim 6, wherein the user input comprises a voice command.

8. The method of claim 1, wherein recognizing the real-world items that already exist in the environment and the determining the preferred characteristics for the environment are implemented in response to receiving a user input that generally requests for an item recommendation for a particular event.

9. The method of claim 1, further comprising accessing information associated with a real-world item to determine the real-world item is to be replaced, wherein the information comprises a life expectancy for the real-world item or an amount of item uses for the real-world item, the rendering of the item to be displayed on the display device of the wearable device corresponding to the real-world item to be replaced in the environment.

10. The method of claim 1, wherein the environment comprises a type of room in a personal residence or a business office.

11. A system comprising:
one or more processors; and
a memory in communication with the one or more processors, the memory having computer-readable instructions stored thereupon which, when executed by the one or more processors, cause the one or more processors to:
recognize, based on image data obtained by a wearable device, real-world items that already exist in an environment;
determine preferred characteristics for the environment based on the real-world items recognized in the image data obtained by the wearable device, wherein the preferred characteristics determined based on the real-world items recognized in the image data obtained by the wearable device include a user preference for a particular price category;
access an item catalog to retrieve three-dimensional model data for an item that has characteristics that correlate to the preferred characteristics and is within the particular price category; and
cause a rendering of the item to be displayed on a display device of the wearable device using the three-dimensional model data.

12. The system of claim 11, wherein the particular price category is determined relative to average prices of items in the item catalog.

13. The system of claim 12, wherein the particular price category comprises one of an expensive price category representative of a user typically spending more than a threshold percentage above the average prices, a moderate price category representative of the user typically spending within the threshold percentage of the average prices, or an inexpensive price category representative of the user typically spending more than a threshold percentage below the average prices.

14. The system of claim 11, wherein the preferred characteristics further include a size category and the size category is determined relative to average sizes of items in the item catalog.

15. The system of claim 14, wherein the size category comprises one of a large size category representative of a user preferring items that are a threshold percentage above the average sizes, a medium size category representative of the user preferring items that are within the threshold percentage of the average sizes, or a small size category representative of the user preferring items that are a threshold percentage below the average sizes.

16. The system of claim 11, wherein the preferred characteristics further include a brand.

17. The system of claim 11, wherein the preferred characteristics further include a decorative theme.

18. The system of claim 11, wherein recognizing the real-world items that already exist in the environment and determining the preferred characteristics for the environment are implemented in response to receiving a user input that specifically requests that the item be displayed in the environment.

19. The system of claim 11, wherein recognizing the real-world items that already exist in the environment and determining the preferred characteristics for the environment are implemented in response to receiving a user input that generally requests for an item recommendation for a particular event.

20. One or more non-transitory computer-readable media having computer-readable instructions stored thereupon which, when executed by one or more processors, cause a system to:
- recognize, based on image data obtained by a wearable device, real-world items that already exist in the environment;
- determine preferred characteristics for an environment based on the real-world items recognized in the image data obtained by the wearable device, wherein the preferred characteristics determined based on the real-world items recognized in the image data obtained by the wearable device include a user preference for a particular price category;
- access an item catalog to retrieve three-dimensional model data for an item that has characteristics that correlate to the preferred characteristics and is within the particular price category; and
- cause a rendering of the item to be displayed on a display device of the wearable device using the three-dimensional model data.

\* \* \* \* \*